United States Patent
Hughes

(10) Patent No.: US 12,130,446 B2
(45) Date of Patent: Oct. 29, 2024

(54) BEAMFORMING VACUUM CELL

(71) Applicant: ColdQuanta, Inc., Boulder, CO (US)

(72) Inventor: Steven Michael Hughes, Louisville, CO (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

(21) Appl. No.: 18/109,762

(22) Filed: Feb. 14, 2023

(65) Prior Publication Data

US 2023/0194884 A1   Jun. 22, 2023

Related U.S. Application Data

(60) Continuation of application No. 16/442,461, filed on Jun. 15, 2019, now Pat. No. 11,604,362, which is a
(Continued)

(51) Int. Cl.
*G02B 27/09*   (2006.01)
*G02B 1/11*   (2015.01)
(Continued)

(52) U.S. Cl.
CPC .......... *G02B 27/0977* (2013.01); *G02B 1/11* (2013.01); *G02B 27/0905* (2013.01);
(Continued)

(58) Field of Classification Search
CPC .... G02B 27/4233; G02B 5/201; G02B 23/04; G02B 27/142; G02B 27/145;
(Continued)

(56) References Cited

U.S. PATENT DOCUMENTS

| | | |
|---|---|---|
| 4,099,841 A | 7/1978 | Ellis |
| 5,076,664 A | 12/1991 | Migozzi |
| | (Continued) | |

FOREIGN PATENT DOCUMENTS

| | | |
|---|---|---|
| CN | 103996973 | 1/2017 |
| CN | 104464869 | 6/2017 |
| | (Continued) | |

OTHER PUBLICATIONS

Lacroute et al.: "Preliminary results of the trapped atom clock on a chip", IEEE Transactions on Ultrasonics, Ferroelectrics and Frequency Control, IEEE, US, vol. 56, No. 4, Jan. 1, 2010 (Jan. 1, 2010), pp. 106-111, XP011286748, ISSN: 0885-3010, Whole Document. (D6 in ISA).
(Continued)

*Primary Examiner* — Christopher Stanford
*Assistant Examiner* — Journey F Sumlar
(74) *Attorney, Agent, or Firm* — Young Basile Hanlon & MacFarlane, P.C.

(57) ABSTRACT

Beamformers are formed (e.g., carved) from a stack of transparent sheets. A rear face of each sheet has a reflective coating. The reflectivities of the coatings vary monotonically with sheet position within the stack. The sheets are tilted relative to the intended direction of an input beam and then bonded to form the stack. The carving can include dicing the stack to yield stacklets, and polishing the stacklets to form beamformers. Each beamformer is thus a stack of beamsplitters, including a front beamsplitter in the form of a triangular or trapezoidal prism, and one or more beamsplitters in the form of rhomboid prisms. In use, a beamformer forms an output beam from an input beam. More specifically, the beamformer splits an input beam into plural output beam components that collectively constitute an
(Continued)

output beam that differs in cross section from the input beam.

16 Claims, 21 Drawing Sheets

Related U.S. Application Data division of application No. 15/806,509, filed on Nov. 8, 2017, now Pat. No. 10,473,943.

(60) Provisional application No. 62/419,915, filed on Nov. 9, 2016.

(51) Int. Cl.
  *G02B 27/10* (2006.01)
  *G02B 27/14* (2006.01)
  *G02B 21/32* (2006.01)

(52) U.S. Cl.
  CPC ......... *G02B 27/108* (2013.01); *G02B 27/142* (2013.01); *G02B 27/145* (2013.01); *G02B 21/32* (2013.01)

(58) Field of Classification Search
  CPC ............ G02B 27/0972; G02B 27/0905; G02B 27/1066; G02B 27/108; G02B 27/0977; G02B 1/11; G02B 6/4206; G02B 1/32
  See application file for complete search history.

(56) References Cited

U.S. PATENT DOCUMENTS

| | | | |
|---|---|---|---|
| 5,096,520 A | 3/1992 | Faris | |
| 6,829,095 B2* | 12/2004 | Amitai | G02B 6/0018 359/636 |
| RE41,193 E | 4/2010 | Nishi | |
| 8,220,966 B2 | 7/2012 | Mukawa | |
| 8,432,614 B2 | 4/2013 | Amitai | |
| 8,749,886 B2 | 6/2014 | Gupta | |
| 8,885,259 B2 | 11/2014 | Mukawa | |
| 8,917,453 B2 | 12/2014 | Bohn | |
| 9,057,826 B2 | 6/2015 | Gupta | |
| 9,442,291 B1* | 9/2016 | Martinez | G02B 27/0172 |
| 9,960,026 B1 | 5/2018 | Hughes | |
| 10,473,943 B1 | 11/2019 | Hughes | |
| 2006/0199476 A1 | 9/2006 | Cok | |
| 2008/0102764 A1 | 5/2008 | Thornton | |
| 2011/0273906 A1 | 11/2011 | Nichol | |
| 2013/0223012 A1* | 8/2013 | Pierides | H05K 7/20409 165/185 |
| 2013/0250431 A1 | 9/2013 | Robbins | |
| 2014/0014826 A1* | 1/2014 | Compton | G04F 5/14 250/251 |
| 2015/0200029 A1 | 7/2015 | Hughes | |
| 2016/0301186 A1 | 10/2016 | Roy | |

FOREIGN PATENT DOCUMENTS

| | | |
|---|---|---|
| CN | 106782739 | 3/2018 |
| JP | H03109527 | 5/1991 |
| WO | 2006086458 | 8/2006 |
| WO | 2009025893 | 2/2009 |

OTHER PUBLICATIONS

PCT International Search Report for PCT/GB2018/053221, Filed Nov. 6, 2018, Priority Date Aug. 11, 2017, mailed Jan. 30, 2019.
Shah et al.: "A Miniature Cold-Atom Frequency Standard", Nov. 24, 2011 (Nov. 24, 2011), XP055469184, Retrieved from the Interne. URL: https://arxiv.org/ftp/arxiv/papers/1111/1111.5890. pdf, Whole Document, (D7 in ISA).

* cited by examiner

FIG. 6
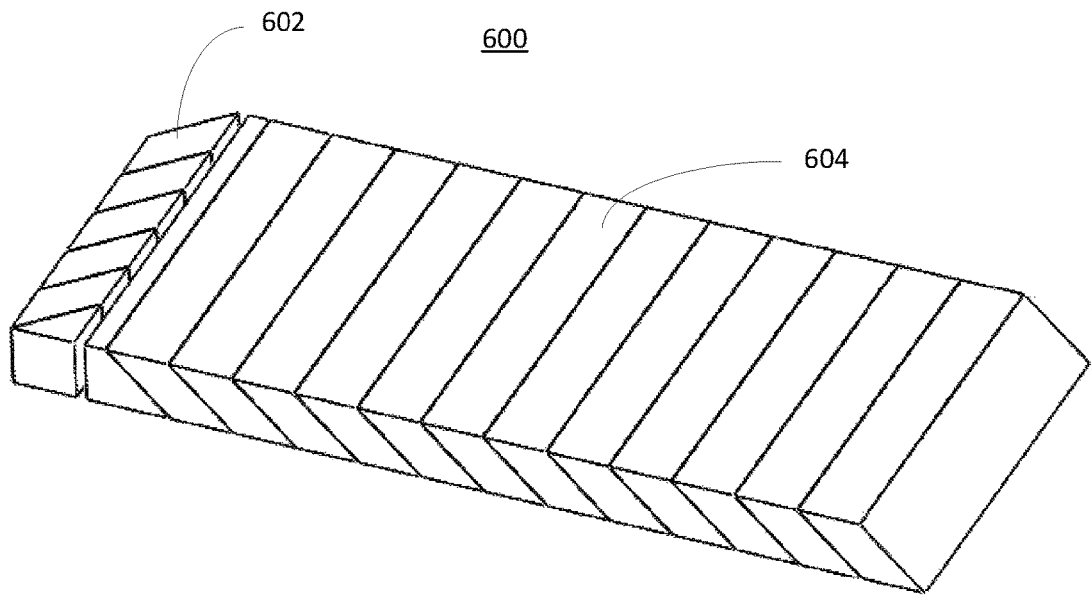
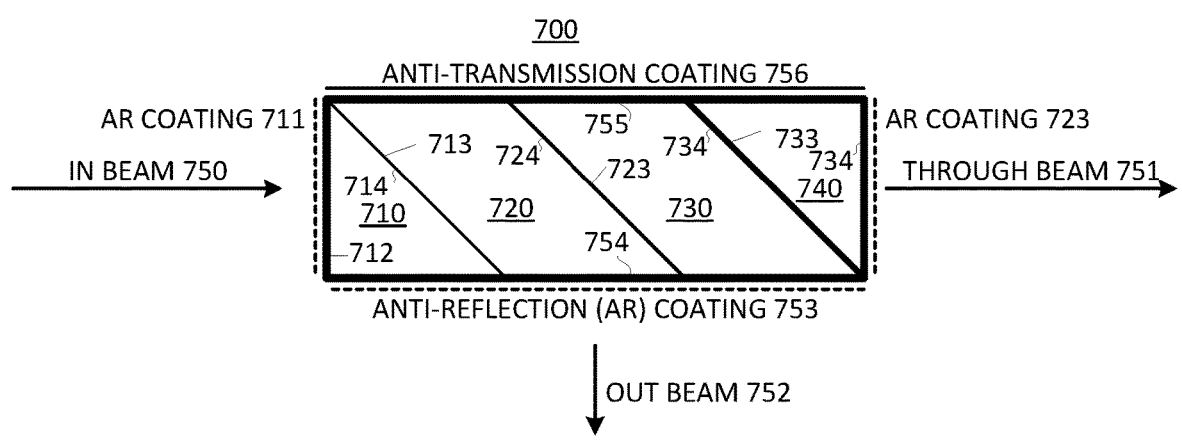
FIG. 7

FIG. 10A
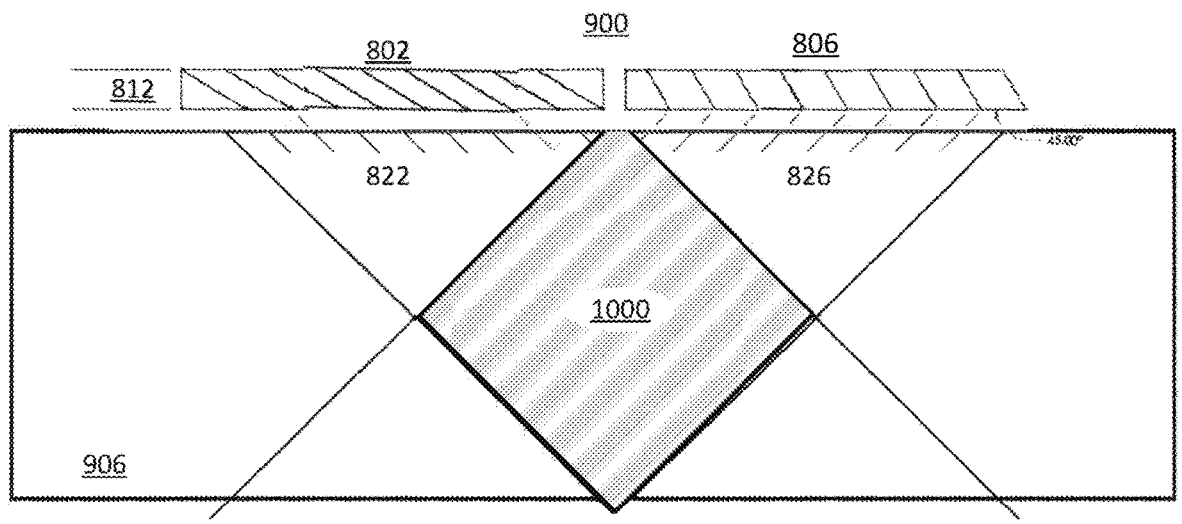
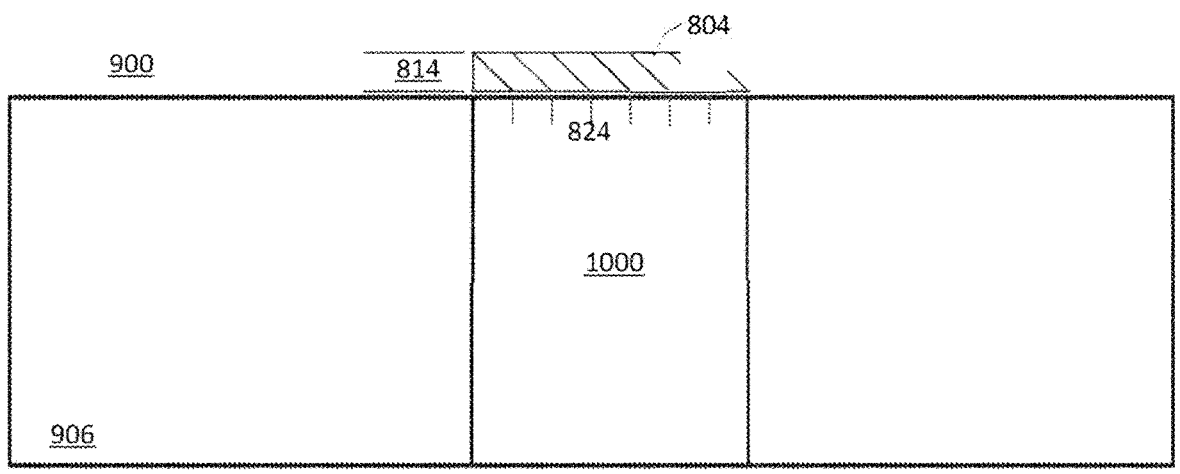
FIG. 10B

BEAMFORMING VACUUM CELL

CROSS REFERENCE TO OTHER APPLICATIONS

This application is a continuation of U.S. patent application Ser. No. 16/442,461 entitled BEAMFORMING VACUUM CELL filed Jun. 15, 2019, which is a divisional of U.S. patent application Ser. No. 15/806,509 entitled FORMING BEAMFORMER HAVING STACKED MONOLITHIC BEAMSPLITTERS filed Nov. 8, 2017, now U.S. Pat. No. 10,473,943, which claims priority to U.S. Provisional Patent Application No. 62/419,915 entitled NESTED CELL FOR LOW POWER CONTINUOUS COLD ATOM SOURCE WITH DUAL COUNTER HELICAL 2D MOT filed Nov. 9, 2016, all of which are incorporated herein by reference for all purposes.

BACKGROUND

As cold atom and other vacuum technologies requiring optical beams scale down in size, the packaging and the support equipment become limiting factors in further downsizing. Thus, optical elements are consuming an increasing fraction of vacuum instrument packages, negatively impacting portability and cost. To achieve further reductions in instrument package sizes and costs, it may be necessary to replace classical beam formers, that is, lenses, with alternatives.

One such alternative is to use beam splitters as beamformers. A cubical beamsplitter can be made by attaching a pair of right-triangular prisms to form a cube or other right rectangular parallelepiped. The interface between the prisms, which forms a planar diagonal of the cube, can be partially reflective and partially transmissive. A beam entering one face of the cube can be split into two beams. Additional beams can be generated using a series of beamsplitters. The output components can be directed in parallel to form a beam that is, for example, about N times wider than the incoming beam, where N is the number of beamsplitters.

Beamformers based on cubical beamsplitters can be practical using cubes of one or more centimeters per side. However, some applications would require more than a few cubical beamsplitters and dimensions of a few millimeters or less per side. At such dimensions and numbers, mass of the optics scales unfavorably while manufacturability becomes an issue, as do the costs involved to address the challenges with manufacturability.

Diffraction gratings can be used as beamformers, but they are not well-suited for beams with cross-sections above 100 microns (0.1 millimeters). This can be mitigated by angling the grating to sheer a small beam into a larger diffracted beam but suppressing undesired diffraction orders complicates the setup and installation of a grating at an angle makes assembly and tolerancing more of a challenge. Gratings may be used in waveguides at a surface or as a volume grating, but these typically are difficult to engineer properly and are often very sensitive to slight misalignments or temperature and wavelength. As a result, there remains a need for compact, low-cost beam formers for beams having diameters in and about a millimeter range.

BRIEF DESCRIPTION OF THE DRAWINGS

FIG. 6 is a perspective view of a two-stage beamformer.

FIG. 7 is a schematic view of a beamformer/beamsplitter with front and rear triangular prisms.

FIGS. 10A and 10B are elevational and plan views of the vacuum system of FIG. 10 (with certain elements omitted from each for clarity).

DETAILED DESCRIPTION

The present invention provides for forming a beamformer from a stack of transparent sheets, each of which can have a partially or completely reflective coating, e.g., on a rear face. The beamformer is carved, e.g., by dicing and polishing, from the stack of sheets. The resulting beamformer includes a stack of beamsplitters. Each beamsplitter of the beamformer stack is carved from a respective sheet of the stack of sheets. Each beamsplitter is a monolithic prism with a reflective coating. The prisms can be rhomboid in shape except that a front beamsplitter can have its front face polished so that the front prism becomes a triangular or trapezoidal prism. Likewise, the back of the beamformer may be cut square to enable a second output beam or tapped beam orthogonal to the primary expanded output beam. The innovative beamformers can be used on nearly any optical cell, nested optical cell, channel cell, or windowed vacuum chamber or other device requiring coupling of a large area beam with minimal wasted volume.

The present invention provides for millimeter-range beamsplitters. Herein, "millimeter range" refers to beamsplitters with a minimum dimension within a range of 0.1 millimeters to 10 millimeters, or 100 microns to a centimeter. Some embodiments are most applicable to a narrower range of 0.3 millimeters (300) microns) to 3 millimeters. Typically, the minimum dimension is the distance between the front and back faces of a beamsplitter.

Figure 1:
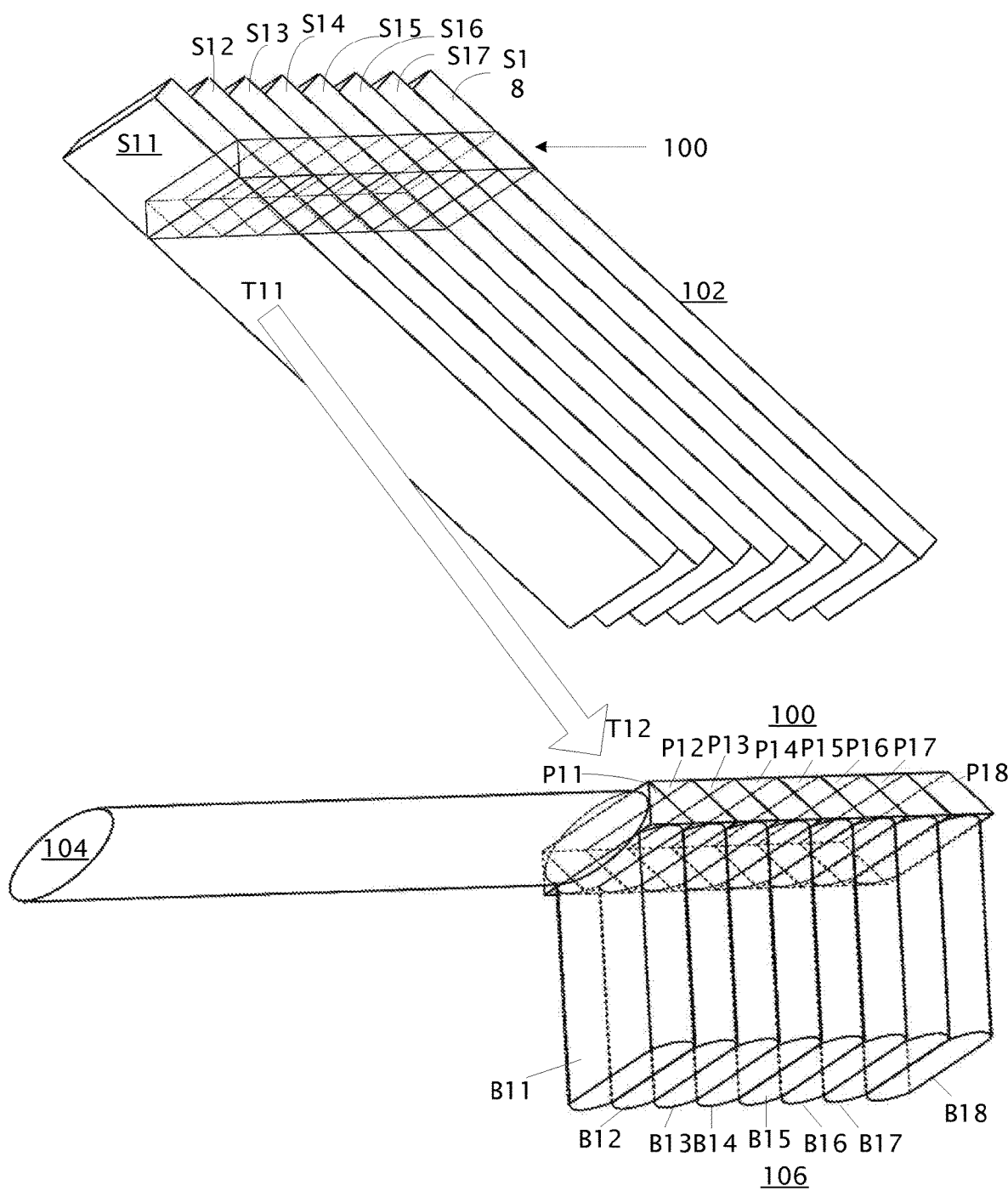
FIG. 1 is a combined perspective illustration of an 8-prism beamformer in the process of its manufacture and during its use as a beamformer.

For example, in FIG. 1, at time period T11, a beamformer 100 is to be carved out of a stack 102 of eight transparent monolithic sheets S11-S18 so that beamformer 100 ends up as an array of a like number of eight monolithic prisms P11-P18, with each prism having been carved out of a respective one of the monolithic sheets S11-S18.

As shown at time T12, an input beam 104 enters beamformer 100 at a front-face of prism P11 and exits as an output beam 106 constituted by eight component beams B11-B18, each of which is orthogonal to input beam 104. Each of component beams B11-B18 results from a reflection by a reflective coating oriented 45° relative to both input beam 104 and the corresponding component output beam. This 45° angle results from the 45° tilt of sheets S11-S18 relative to the planned beam direction. In other embodiments, this tilt can differ from 45°.

Due to this 45° tilt, prisms P11-P18 are, at least initially, rhomboid prisms. However, front prism P11 is polished to define a front face that is orthogonal to the planned direction of transmission for input beam 104. Accordingly, front prism P11 is a triangular prism; in an alternative embodiment, the front prism can be a trapezoidal prism. In an alternative embodiment, the last prism can be triangular or trapezoidal as well.

Figure 2:
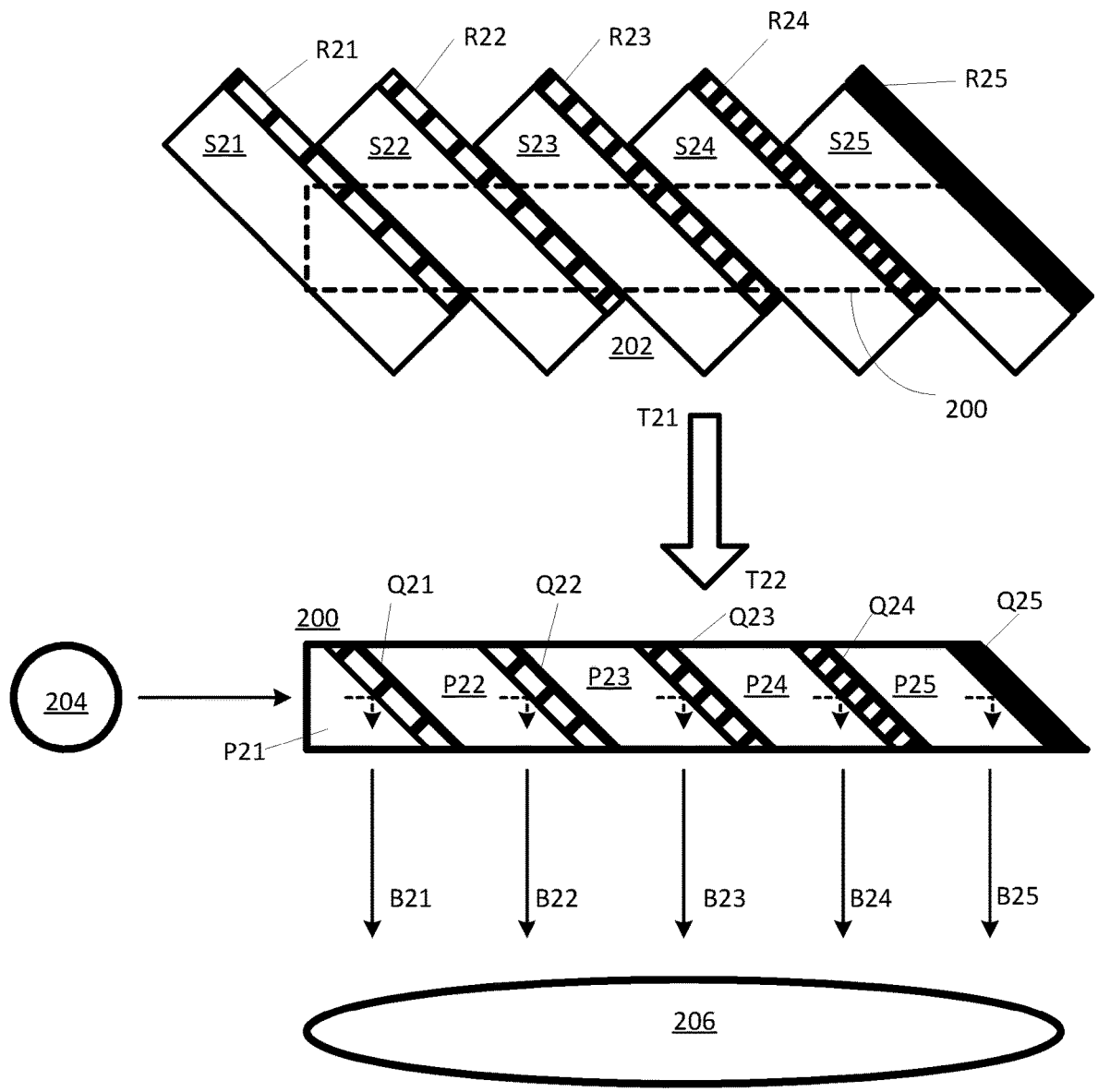
FIG. 2 is a schematic illustration of a 5-prism beamformer in the process of its manufacture and during its use as a beamformer.

A second beamformer 200), shown in FIG. 2 is carved from a stack 202 of transparent sheets S21-S25. As a result, beamformer 200) has a front trapezoidal prism P21 and rhomboid prisms P22-P25. As indicated in FIG. 2, each sheet S21-S25 has a reflective coating R21-R25. Accordingly, each prism P21-P25 has a reflective coating Q21-Q25.

The reflectivities are 20%, 25%, 33%, 50%, and 100%, respectively for coatings R21-R25 and respectively for coatings Q21-Q25. These values, which correspond to the fractional values 1/5, 1/4, 1/3, 1/2, and 1/1, are selected so that the light of input beam 104 is evenly distributed among output beam components B21-B25. More generally, for an N-prism beam former, the reflectivity associated with the front prism can be about 1/N, with successive reflectivities increasing as 1/(N+1-1) for the ith prism. As described further below, in some embodiments, some lower percentages appear twice in succession in a stack to reduce the number of different reflectivities required and, thus, to save manufacturing costs. They may also all be lowered by some factor to enable the beamformer to only reflect a fraction of the total power, allowing the remainder to pass straight through for other purposes.

Beamformer 200 is designed to convert an input beam 204 to an output beam 206 with a 5× elongated cross section. A similar transformation of beam cross section could be accomplished using an array of cube beamsplitters. Each cube beamsplitter includes two triangular right isosceles prisms bonded together with a reflective layer at the interface. A beamsplitter could then be assembled by bonding the resulting beamsplitting cubes together. Thus there are two monolithic prisms per cube beamsplitter; therefore, a beamformer made by assembling cube beamsplitters would have twice as many monolithic elements as a stacked beamformer carved from plates. This means that a cube-based beamformer would have about twice as many interfaces between monolithic elements that might negatively impact the transmission characteristics of the beamformer.

In terms of manufacturability, the present invention offers many advantages including small component counts and ease of forming a beamformer from sheets than from triangular prisms. Furthermore, although FIG. 2 indicates only one beamformer is carved from a stack, it is clear from FIG. 1 that many beamformers can be carved out of a stack of sheets, provided the sheet dimensions are relatively large. Finally, compared to fabricating beamformers from arrays of cubes, it is relatively simple to scale down to millimeter dimensions and below when manufacture is based on stacks of sheets. In summary, the present invention offers numerous advantages over at least one alternative that also uses beamsplitters.

Figure 3:
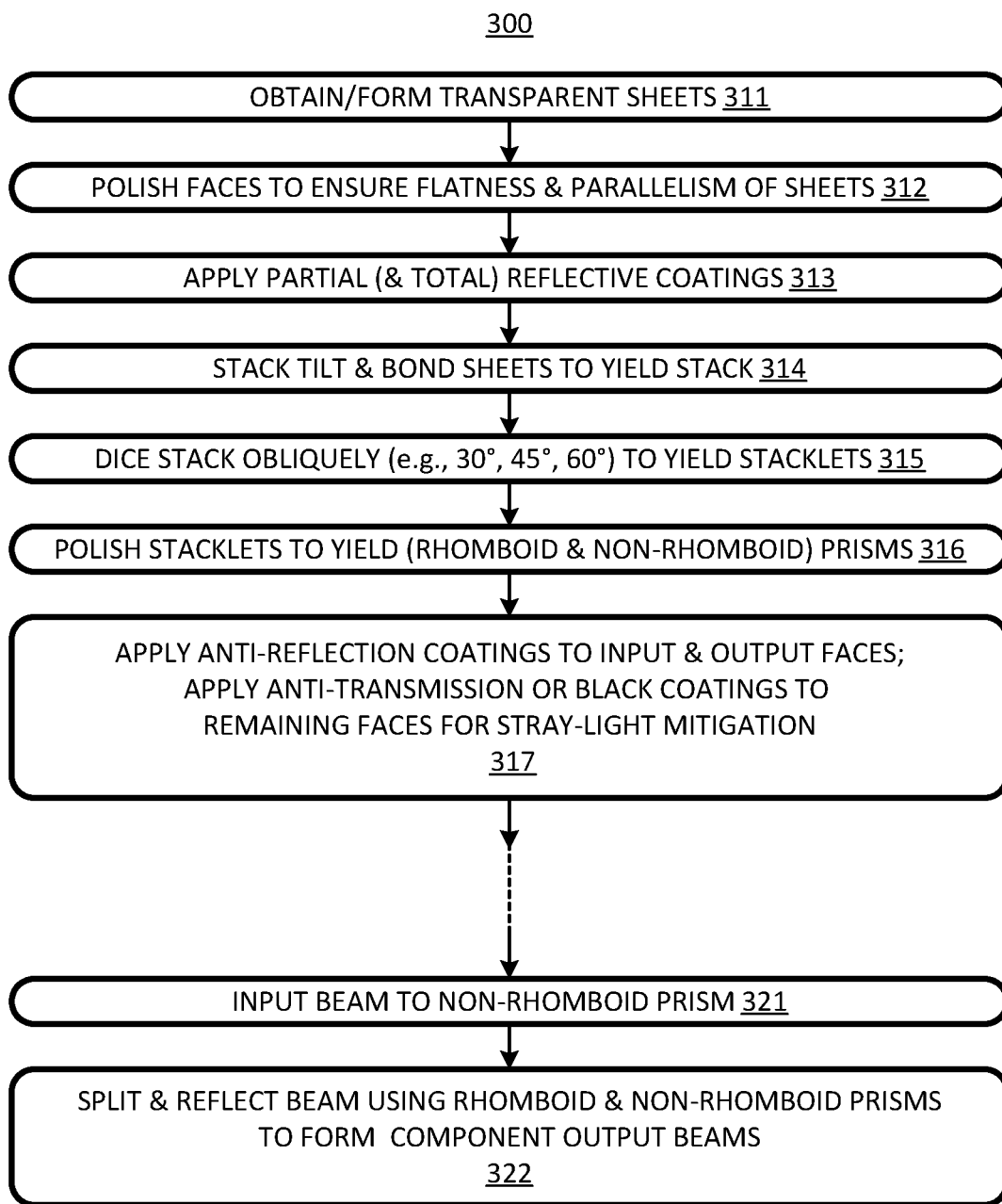
FIG. 3 is a flow chart of a process for making and using a beamformer.

A process 300 for making and using a beamformer is flow charted in FIG. 3. At 311, transparent sheets are formed or otherwise obtained. Herein, "transparent" regards visible, infrared, and/or ultraviolet light within a frequency range of interest. The sheets may be purchased, manufactured, or grown (e.g., using photolithographic techniques), for example. The sheets may be thick or thin, depending, for example, on the desired dimensions of the beamsplitters that collectively constitutes the beamformer.

Herein, a "sheet" is defined as an object with two parallel faces separated by edges of smaller cross sectional area than the area of the faces. For example, the faces have areas of several square centimeters, while the edges can be between 100) microns and half a centimeter thick and have a total area less than one-square centimeter.

At 312, the faces of the sheets are polished to ensure flatness and parallelism of the sheets. Advantageously, both faces may be polished at once in a parallel polishing operation. If flatness is otherwise assured or obtained, this polishing may be omitted. Commercially, achieving parallel plates is significantly easier than achieving 90° and 45° polishing making fabrication of the beamformer constituent components vastly easier than their cube counterparts. Further sequential stackup error of triangular prisms is more likely to lead to an output beam that is not comprised of parallel beam sections, while sequential stackup error of very parallel plates comprising the proposed beamformer will be very parallel to each other yielding superior output beam specifications with less effort or expense, regardless of the output angle.

At 313, reflective coatings are applied to the sheets. One face of each sheet is coated. Due to symmetries of the sheets, the face to be coated can be selected arbitrarily. However, once coated, the coated face is referred to herein as the "rear" face and the opposing face is the "front" face. The reflective coatings can have different reflectivities, as explained above with reference to FIG. 2. Further, while homogenous glass or crystal is often chosen, birefringent materials may also be used wherein the orientation of their fast and slow axis may be used to adjust polarization before, and/or after each reflection. Further, a birefringent and or piezoelectric substrate formed into beamformers may be used with electrodes such as ITO and a voltage potential modulation to modulate the birefringent properties thereby modulating the path length and or polarization in each segment.

At 314, the polished and coated sheets are stacked. The flatness of the sheets ensures good optical connections between adjacent sheets. The sheets are preferably tilted, e.g., at 45° or other oblique angle relative to a base or other reference that will turn out to have been parallel to an input beam path for the beamformer being manufactured. In some embodiments, the sheets are not tilted, or are tilted at an angle other than 45°. The sheets are then bonded, with each rear faces being bonded to the front faces of other sheets with exceptions for sheets at the front (top) and rear (bottom) of the stack.

Figure 4:
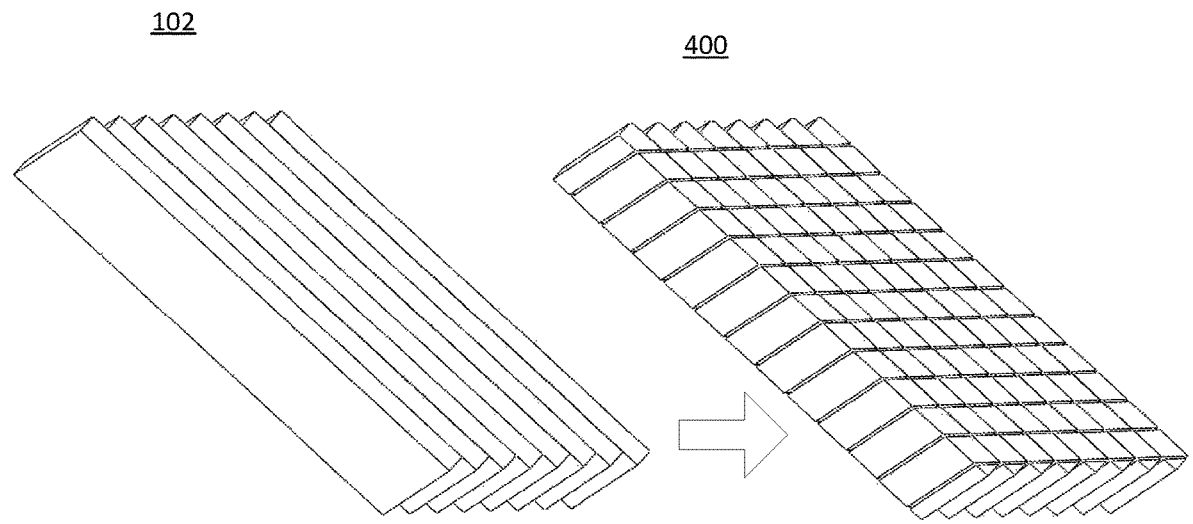
FIG. 4 is a flow diagram showing dicing of a stack of FIG. 1 for forming beamformers in accordance with the process of FIG. 3.
Figure 5:
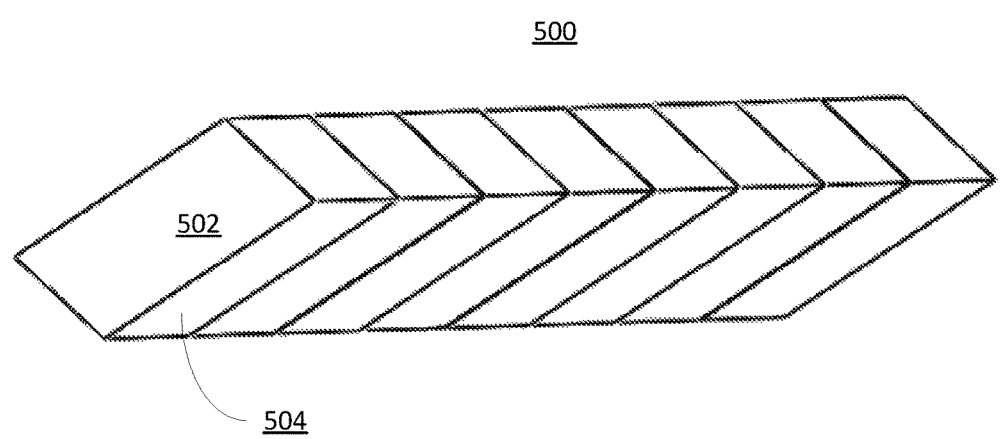
FIG. 5 is a perspective illustration of a beamformer stacklet resulting from the dicing represented in FIG. 4.

At 315, the stack of sheets is obliquely (e.g., at a 45° angle to the faces) diced to form plural stacks (aka, "stacklets") of monolithic beamsplitters. It is an economic advantage of the invention that one stack of sheets can be used for manufacturing plural beamformers. To this end, stack 102 (shown in FIGS. 1 and 4) can be diced as indicated at 400, in FIG. 4. This dicing yields stacklets of monolithic beamsplitters, such as stacklet 500, shown in FIG. 5. Where the stack was tilted prior to bonding, the dicing can be parallel to the stack base; where the stack was not tilted prior to bonding, some other approach can be taken to implement the oblique dicing.

At 316, each stacklet is polished to its final form. Polishing input and output faces improves transmission characteristics into and out of the beamformer. Polishing other exposed faces of the beamformer reduces opportunities for light scatter or leaks by maintaining a constant angle for internal reflections. Note that a front face 502 of a rhomboid input prism 504 of stacklet 500 (FIG. 5) is polished so that the front face of the beamformer (100, FIG. 1) is orthogonal to the input beam direction to optimize transmission into the beamformer. Thus, the rhomboid front prism 504 of stacklet 500 becomes a triangular or trapezoidal front prism of the beamformer. Note that all stacklets diced from a stack of sheets may economically be polished in parallel.

At 317, anti-reflection (AR) coatings can be applied to the input and output faces of the beamformer to improve transmission characteristics into and out of the beamformer. These coatings may be omitted, e.g., to save costs and manufacturing complexity, if the transmission characteristics are not critical. This completes manufacture of the beamformer. Non transmitting faces may be black or absorptive coated to reduce undesired light scatter and reflections. Non-transmitting faces may also be high-reflectivity coated to maximize light out of the output face, especially in configurations where the output beam may be retroreflected back into the beamformer, thus increasing the effective output power of the beamformer by at least 50%. Note the input faces of plural beamformers may be AR coated in a single operation; likewise, the output faces of plural beamformers may be AR coated in a single operation to leverage economies of scale.

At 321, in input beam is transmitted into the non-rhomboid front face of the beamformer. At 322, the input beam is split at each reflector (except the last, which reflects the entire incident beam) and reflected to yield component output beams that are output from the beamformer. The component output beams collectively constitute the output beam for the beamformer. For example, component beams B11-B18 constitute output beam 106 in FIG. 1.

Multistage beamformers can be made by ganging simple beamformers. For example, a multistage beamformer 600 is shown in FIG. 6 including a first stage beamformer 602 and a second stage beamformer 604. First stage beamformer 602 can convert an input beam with a circular cross section to a beam with an elongated cross section. The beam with the elongated cross section can be input to the second-stage beamformer 604, which expands the beam cross section in the direction orthogonal to that of the original elongation. Alternatively, if the reflectivities of a first beamformer are lowered by some factor and the last reflector is not 100% then the light leaving the last reflector may launch into another optical or another beamformer allowing a single beam to be split and formed by two beamformers in the same or different directions. For example a first beamformer whose output beam is at +30 degrees from normal to the large face of the beamformer may be followed by a second beamformer whose output beam is at −30 degrees from normal or 60 degrees from the first beam allowing these beams to cross at some distance from the plane of both beamformers to form part of an optical trap or lattice. Other angles and orientations are also possible.

As shown in FIG. 7, a beamformer 700) includes an array of four monolithic prisms. A front beamsplitter 710 is a triangular prism with an anti-reflective (AR) coating 711 on its non-oblique front face 712 and a 20% reflectivity coating 713 on its oblique rear face 714. Beamsplitter 720 is adjacent to front beamsplitter 710 and is a rhomboid prism with a 25% reflectivity coating 723 on it oblique rear face 724. Beamsplitter 730 is adjacent beamsplitter 720 and is a rhomboid prism with a 33% reflectivity coating 723 on its oblique rear face 734. A fourth prism 740 is adjacent beamsplitter 730; prism 704 is a triangular prism and has an AR coating 743 on its non-oblique rear face 744. The right-angled rear face 744 can facilitate coupling to other optical elements, e.g., one may wish to daisy chain beamformers or tap out the end as a second output beam.

The reflectivities of coatings 713, 723, and 733 are chosen so that half of the light of an input beam 750 transmits through beamformer 700 to yield a through beam 751 in addition to the reflected output beam 752 (which is constituted by component output beams for beamsplitters 710, 720, and 730. Different reflectivities can be chosen to change the ratio of light in the through beam to the light in the reflected output beam. However, no completely (100%) reflective coatings are applied to rear prism faces unless there is to be no through beam. An AR coating 733 is applied to the output (bottom) face 754 of beamformer 700. The remaining faces of beamformer 700, i.e., the faces through which light is not to be transmitted, e.g., top face 755, can have an anti-transmissive or black coating 756 to mitigate light leaks.

Figure 8:
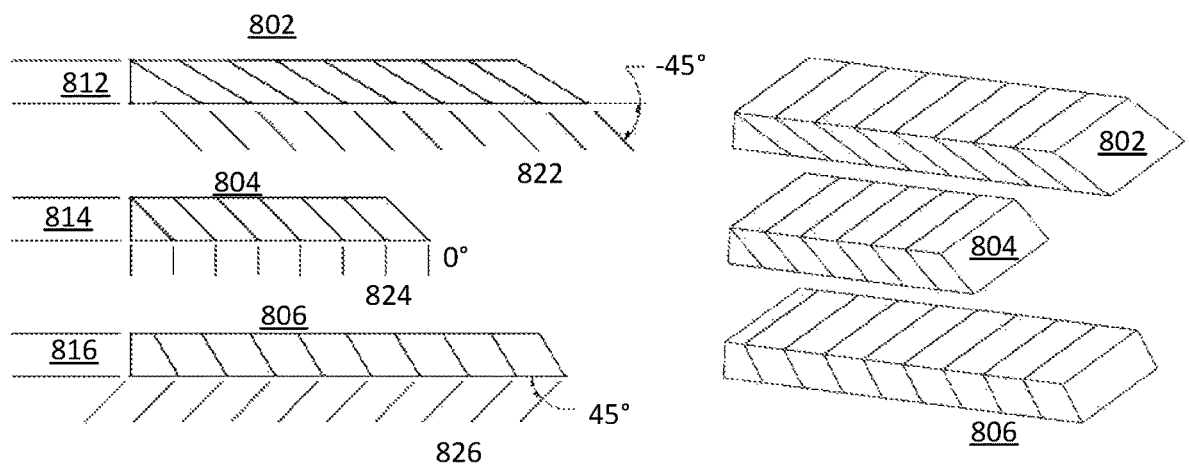
FIG. 8 presents a comparison of three beamformers with reflective coatings at different angles so that their output beams transmit in different directions.

FIG. 8 provides a comparison among three beamformers 802, 804, and 806 intended to convert a 1×N beam into an M×N beam at different angles. Beamformer 804 is formed from transparent sheets titled 45° relative to the input beam 814, resulting in downward transmitting output beam 822 that is angled 0° from a vertical or, more specifically, a downward-pointed ray. Beamformer 802 is formed from a stack of sheets titled more than 45° so that a horizontal input beam 812 resulting in an output beam titled 45° from a vertical. Beamformer 806 is formed from a stack of transparent sheets titled less than 45° so that a horizontal input beam 816 results in an output beam tilted −45° relative to a vertical.

Accounting for Snell's law, the splitting plane angle can be adjusted to deflect the output beam at angles other than normal to the output surface. This is advantageous when an angled beam in a cell, such as for crossing beams to form an optical lattice or trap is required, but minimal external optics is still desired. In this manner the length of the beamformer must necessarily lengthen along one axis per axis of tilt to accommodate the projection of the tilted beam with respect to the plane of the beamformer. TO achieve this lengthening the thickness of the beamformer must increase or the number of elements must increase.

Figure 9:
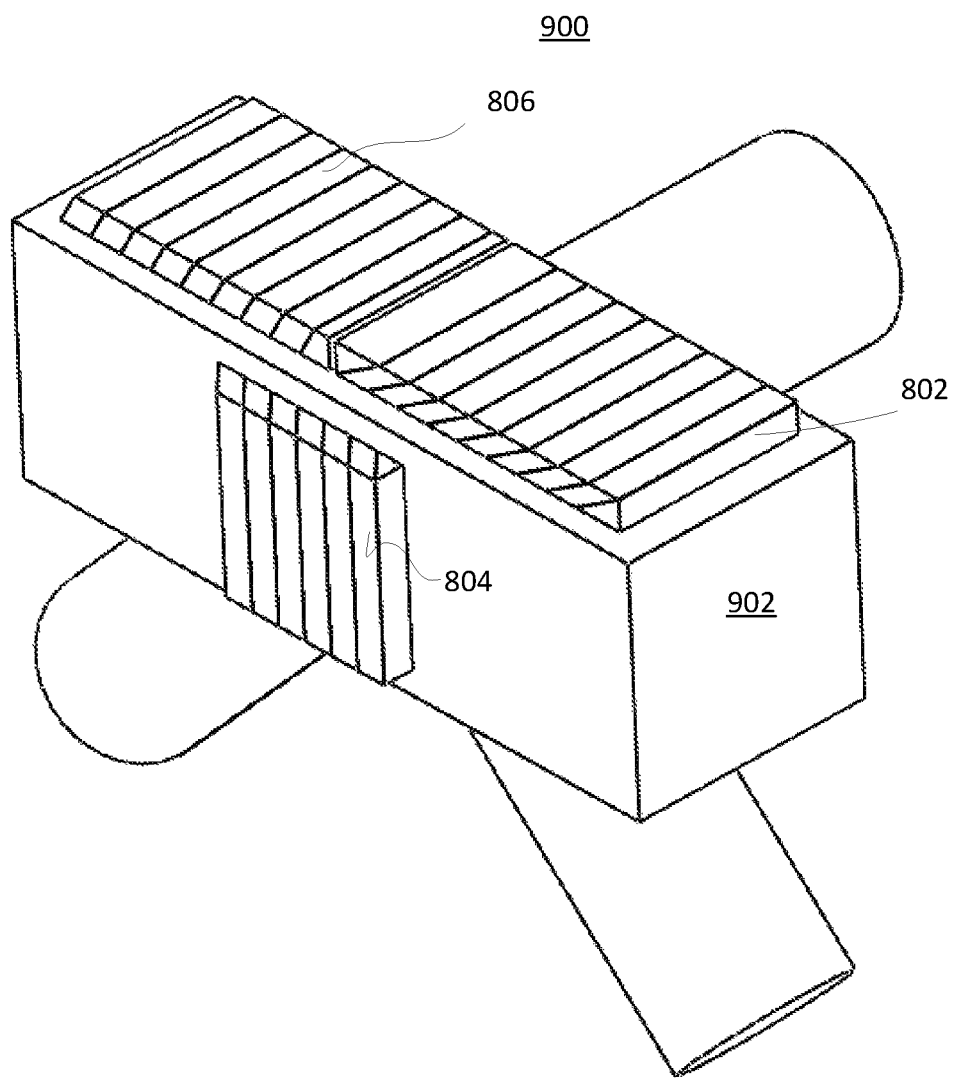
FIG. 9 is an isometric view of vacuum system having the beamformers of FIG. 8 mounted thereon.

A vacuum system 900, shown in FIG. 9, includes a vacuum cell 902 on which beamformers 802, 804, and 806 are mounted to define an optical trap, which can be readily adapted to form a magneto-optical trap MOT, a lattice, or a molasses, as is apparent to those skilled in the art.

As seen in the schematic side-elevational FIG. 10A, in which beamformer 804 is omitted for clarity, beamformers 802 and 806 are arranged end-to-end so that some of the light entering beamformer 802 is transmitted into beamformer 806. Light 822 and 826 output respectively from beamformers 802 and 806 is transmitted into cell 902 at a −45° angle with respect to a downward ray. This defines an intersection region 1000 which is diamond shaped from the perspective of FIG. 10A. More specifically, beams 822 and 826 are orthogonal to each other.

As seen in the plan view of FIG. 10B, which omits beamformers 802 and 806 for clarity, beamformer 804 is mounted on vacuum cell 906 so that it converts input beam 814 straight into cell 906. Within intersection region output beams 822 (FIG. 10A), 824 (FIG. 10B), and 826 (FIG. 10A) are orthogonal to each other so as to define an optical trap, that can be used to define a magneto-optical trap (MOT), a lattice, or a molasses.

FIGS. 9, 10A and 10B use the plus and minus 45° outputs of beamformers 802 and 806 for the purpose of creating a crossed optical trap within a chamber while minimally consuming volume outside of the chamber. This may be contrasted to the shorter and more efficient standard beamformer 804 that launches at 90° from its surface straight into such a chamber. Also note the last prism on the first expander is polished at 90° degrees and the last reflector is not 100%, allowing the leftover beam (roughly 50% for this example) to launch into the next −45° beamformer in sequence forming two crossing beams from a single beam in minimal volume.

Figures 11A, 11B:
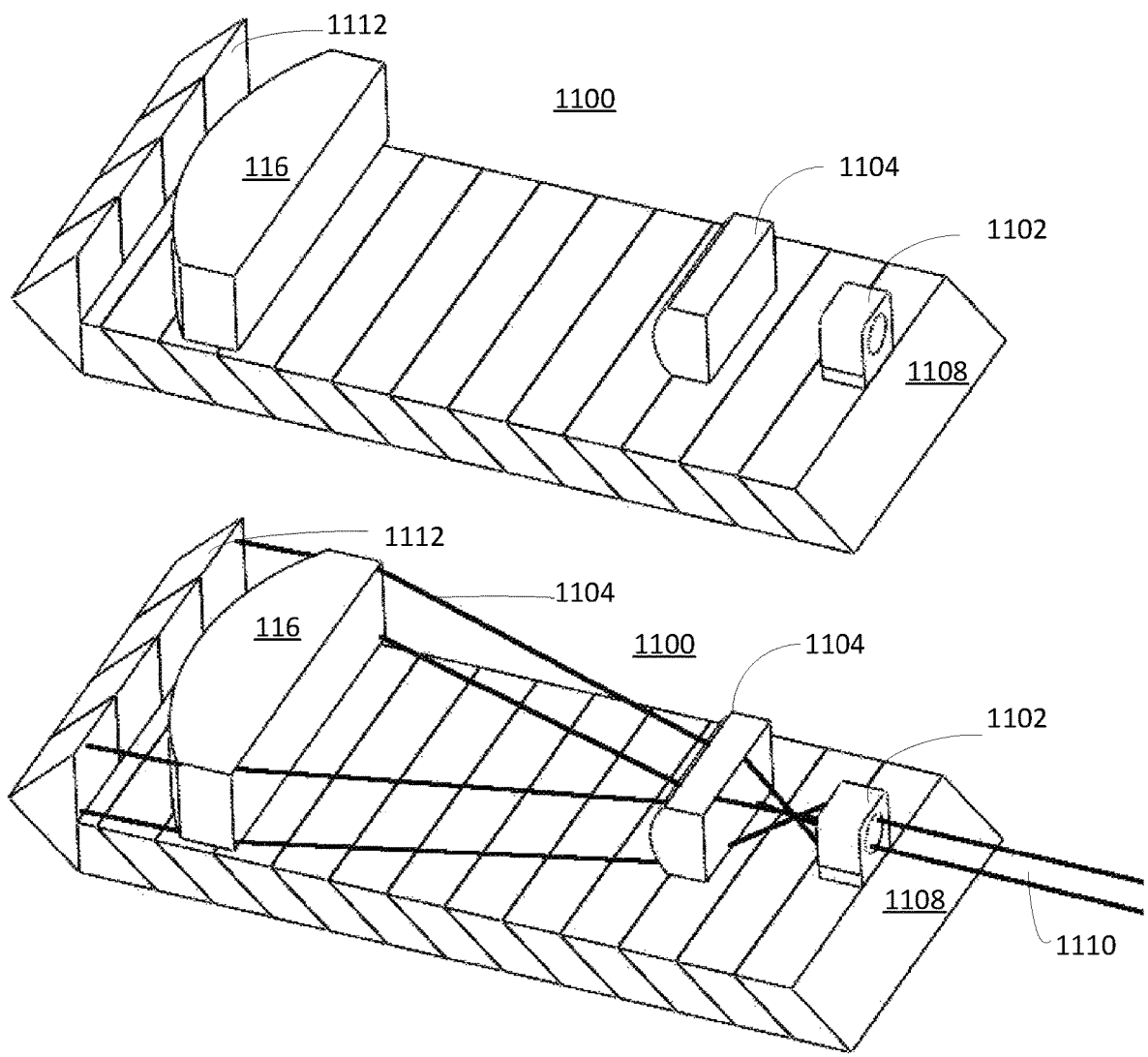
FIGS. 11A and 11B are isometrics views of an optical system in which lens elements are mounted on a beamformer, with 11B showing a beam path through the lens elements.

An optical system 1100, shown in FIGS. 11A and 11B, has a beamformer with conventional low-profile cylindrical optics and roof prisms. In optical system 1100, a spherical lens element 1102, a first cylindrical lens element 1104, and a second cylindrical lens element 1106 are mounted on a beamformer 1108. As shown in FIG. 11A, lens elements 1102, 1104, and 1104, reform an input beam 1110 to match the input of a reflector 1112; reflector 1112 reflects the beam so that it is input to beamformer 1108. Using a beamformer as a base or lens or other optical element is a space-efficient way of implementing an optical system.

One method of pre-expansion that costs at most twice the volume of the beamformer involves using cylindrical and spherical or aspherical optics to expand the beam from a small circular or near circular cross section to a 1×N dimension beam prior to launch into the larger beamformer which will yield an M×N beam via an array of M (1×N) beams. Any combination of spherical, cylindrical or other refractory or prism expansion optics may be used in this first round of expansion and may utilize the back plane of the beamformer as an optical mount to fold the expander into a compact module.

Modern deployable devices tend to operate using diode lasers. Whether these couple straight to a fiber or to the device, the output of both typically requires a conical volume of clear aperture for the beam to expand in free space or in glass, until it gets to the desired dimensions at which point a refractive optic is typically used to collimate the beam. After expansion any swept optical path not spent in the device further consumes volume in the device. Therefore beams requiring a cross sectional area of say an inch then consume at least a cubic inch per beam. This quickly consumes significant volumes rendering devices too impractical or bulky for personal-sized units, limiting deployability and robustness to shock and vibe.

Beamsplitters disclosed herein can cut the consumed volume down typically by at least a factor of 4 and often by a factor of 10 or more. Some applications may call for beams that are symmetric or asymmetric (one axis longer than the other). As asymmetric is the more complex case it is discussed as the example. To achieve economical beam expansion (both volumetric and financial) with conventional reflective optics one may start by using 2-3 cubed beamsplitters of ratios such as 30:70, 50:50, and 100:0. Glued back to back, these beamsplitters consume a volume less than that required by cylindrical optics while suffering minimal wavefront aberration. Thus an array of three such cube splitters allows for a transformation of a 1×1 to a 1×3 unit beam area by effectively replicating the beam into three identical copies right next to each other.

Gaussian beams are typically round in nature and therefore the fill factor of the resulting 1×3 beam may be undesirable. The poor fill factor can be mitigated in a few ways. First, one may over expand the incoming beam before it launches into the series of splitting cubes fully filling the clear aperture of the cubes and therefore the clear aperture (CA) of the resulting 1×3 beam. However uniformity may still be less than desirable due to the Gaussian nature of the beam.

Second, a beam diffuser or engineered diffuser may be used at the input or output, though a smaller and therefore cheaper one is needed at the input. The tradeoff here is the diffuser often loses quite a bit of light, wavefront quality is lost, and the effective distance from the engineered diffuser to each of the segmented output beam parts may result in undesired and non-uniform beam cross talk, overlap, and quality.

Third, the collimated beam may be defocused or decollimated slightly to allow a slight expansion of the beam so that after the three segments exit they expand to overlap. This can yield nice wavefronts overall but interference between beams may be problematic. For magneto-optical traps (MOTs), this is usually less of an issue and may be corrected for with a very low magnitude diffuser or spatial scrambling optic. Indeed, for magneto optical trapping, a good wavefront is often not critical and minor scrambling can be beneficial to minimize optical coherent interference effects.

Unfortunately a 1×3 cube beamsplitter array can be volumetrically inefficient, especially as an expansion telescope for expanding a small beam or fiber up to fill the clear aperture. However if we used an array of thinner beamsplitter plates at 45° (or other angles as desired, e.g., in a 3D MOT, where each successive splitter split an increasingly higher percentage of the beam) then a multi element splitter from say 5 to 50 layers could expand a n-by-n beam into an n-by-x*m beam where m=the number of layers of the beamformer stack. Alternatively the input beam may be elongated by turning a L-by-n beam into an L-by-x*m beam or turning a beam that is already expanded in one dimension into an output beam expanded by the same or a different factor in another dimension (typically but not necessarily an orthogonal dimension). Therefore a relatively thin stack of this beamformer optic can achieve the effective desired beam expansion or fill factor at a fraction of the total consumed volume and mass required by traditional refractive optics.

There are scalable advantages to beamformer with stacked monolithic beamsplitters. For a high order beamformer, say with more than six elements, depending on the required intensity uniformity of the output beam, lower reflectivity layers may be "doubled up" in fabrication to save costs of making additional finely tuned reflective layers. For example in a 12 element array such as beamformer 604 (FIG. 6), elements 1-2, 3-4, and 5-6 may be the same reflectivity. In this case, the ideal calls for reflectivities that yield P/N, where P=total power and N=number of layers where, for each segment m, the desired output power would be P/N. Then the desired reflectivity of each reflector m would be $1/(N-m+1)$. Therefore for a 12-element segment the reflectivities would be 0.0833 (1/12), 0.0909 (1/11), 0.1 (1/10), 0.111 (1/9), 0.125 (1/8), 0.143 (1/7), 0.167 (1/6), 0.2 (1/5), 0.25 (1/4), 0.33 (1/3), 0.5 (1/2), 1 (1/1).

However, to save cost, the ratios could be 0.83, 0.83, 0.1, 0.1, 0.125, 0.125, 0.167, 0.2, 0.25, 0.33, 0.5, and 1. Alternatively the paired reflectivities may be an average of the two that were replaced. By doubling up the first six layers into three batches, the price at volume may drop by as much as 25% while only suffering an error in reflectivity of 11% or less. Alternatively, the first six layers can have reflectivities of 0.087, 0.105, and 0.134 to bring deviation from ideal down to under 6%. Depending on the quality of the coating and the spec this may be within the range of the coating error.

Another scalable advantage over cubed beamsplitters is using its initial apparent increased cost in fabrication into a strength. Splitter cubes are often 45°-45°-90° prisms that have to be polished to a precise specification and are then assembled by direct or adhesive bonding. Alignment of the triangles (triangular prisms) to make a cube is often critical and must be done individually. On the other hand, to make the stack, plates (sheets) are more easily made parallel by standard polishing practices, though more components are needed for a stack, each only requires two relatively simple polishing operations, and the coating operation likewise only deals with a single side coating whereas coatings of cubes often requires at least five faces (two of one triangular prism and three of another triangular prism) to be coated.

In the initial assembly of the stack array each plate gets polished on both sides but coated on just one side. These sides may then be stacked sequentially and then the entire stack is tilted allowing the parts to slide in a shear-like fashion until a tilt angle of roughly half of the total turning angle is achieved, an angle dictated by Snells law for the output beam. They are then bonded at this angle making just about any angle beamsplitter from a 90° output to + or −45° relatively easy to achieve. The top and bottom layers are then cut down to remove the points turning the stack into a rhomboid parallelogram. The parallelogram is then diced parallel to the top or bottom face to maintain the output reflected angle. The thickness of each slice is determined by the thickness of the slabs and the desired output angle in order to ensure 100% optimal fill factor for the given reflected angle.

Given the nature of optical polarization off of reflective films, it is ideal to select a linear polarization at which the stack is designed to operate. The linear input polarization then translates directly to an output linear polarization for all beams. If the polarization at the input rotates it may be impractical to maintain splitting ratios. However a thin polymer, crystal or other waveplate(s) may be mounted just after or adhered to the output surface of the beamformer adding a negligible additional volume to the device while enabling the desired target linear or circular polarization. Depending on the input polarization, and the collimated, focusing, or diffused nature of the input beam it may be desired to place a waveplate(s) at or on the input surface of the beamformer as well.

Beamformers can be used as free space fiber coupled beam sources and may be mounted on tip-tilt stages to adjust pointing. Mounts may be typical ball spring mounts or low profile machined, electro-discharge machining (EDM), machined, micro electro-mechanical systems (MEMS), or 3D printed type flexures for minimal volumetric consumption of the mount and tight conformity to the beamformer. Materials may even include glass or silicon for thermal matching as well as traditional metals and polymers. Glass or ceramic flexures typically need to have careful surface finishes to reduce odds of fractures or failures during flexure. methods of adhesion may be clamping, gluing, eutects, tlp, anodic or contact bonding.

In cases where the materials of the beamformer are dielectric with minimal or no polymers, then integration of the beamformer into the vacuum cell or even as part of the vacuum cell walls, body, or window can further improve compactness and functionality of the system. In more advanced versions, one or more walls can be made out of a large area beamformer where light is coupled into the beamformer directly through the edge of the glass/former, or through a wedge prism on the surface just before the beamsplitter stack. Such surface beamformers can also be patterned gratings on the inner or outer surface of the glass with respect to the vacuum cavity; the patterns can be formed by photolithographic etching of the glass, or thermally "stamping" and removal of a sacrificial silicon grating negative. The grating or reflective layers may be written into the volume or bulk of the glass or holographic media through photorefractive effects, or ultrafast pulsed laser rastering or patterning in the bulk media.

Beamformers can be glass or other transparent material. Depending on wavelength, beamformers can be silicon for long infrared (IR) or other media transparent to the wavelength of interest. Beamsplitting layers can be surface coatings such as but not limited to IBS, EBS, CVD, or reflection properties may be achieved through refractive effects from rastered, imaged, doped, or optically patterned/interfered gratings, planar refractive indices, gradient indices, or nano-structured surfaces or layers to define reflection or splitting layers. Topographical or bulk meta-materials may likewise be used to define layers or coatings.

Beamformers may be individual beam-to-line generators, line-to-large-area beam generators, or even beam-to-large-area beam generators by mounting a beam-to-line and line-large-area generator in sequence and even glued with the output of one matched to the input of the second with or without a waveplate or diffusive element sandwiched between.

Beamformer line-to-large-area generators can first have a cylindrical telescope or refractive line generator as the pre expansion optic. Such a telescope can be mounted in line or even folded with turning mirrors and mounted to the top surface of the line-to-large-area generator effectively doubling its "thickness" but keeping the form factor smaller than conventional free space optic approaches.

Output faces of beamformers may be anti-reflection (AR) coated, but, if the surfaces are to be in close proximity to waveplates or the window of an optical cell, then an index matching fluid or glue may be used to simply optically couple the parts by direct contact. An adhesive like Norland UV cured optical glues work well for this, effectively negating the need for AR coatings on intermediate optics that will be part of a sandwich or stack. Therefore only the input optical surface to the assembly, such as the waveplate or diffuser, and the output surface, such as the inside of the cold atom cell, need consider being AR coated.

Where assemblies and orientations are to be permanent an adhesive may be used, where some adjustability such as waveplate rotation may be required, an index matching fluid may be used; the part can be affixed with an engineered accommodating gap to allow for rotation while minimizing fluid dryout. It would however be preferable that all waveplates be pre aligned and affixed before component installation. The backside of the beamformer opposite the output beam, or on the unused edge of the beamformer may also be used as an optical bench to which pre-expansion fibers, cylindrical or other optics are adhered minimizing the assembly and defining a second optical plane parallel to the beam expander.

The multi-stack beamformer can be replaced with a volume holographic diffraction/reflective element to achieve the same effect with thinner materials, and more engineered expansion properties. One holographic element may expand the entire beam sequentially or at the same time. Two elements may be stacked coupling into each other at one end and laminated together for optimal coupling to take light straight from an uncollimated fiber. A combination of holographic beamforming and waveguiding may be used to take the output of a fiber and convert it to the desired beam profile. Any combination of the above may be combined for maximum efficiency or effectiveness in form and function.

Through heating of engineered reflection layers, a beamformer can be tuned for the wavelength or wavelengths of interest or to tune polarization or behavior of different polarizations of the same beam. Conductive and insulative layers such as ITO and SiO2 TaO5 can capacitively modulate performance by applying a potential across individual layers with small patterned traces on the backside, or applying a potential across the entire stack. Piezoelectric coatings or substrates with careful alignment of crystalline axis to linear polarization of the beam can likewise allow selective modulation.

Multi-wavelength beamformers can involve engineering the same desired S or P polarization at the desired same reflectivities for multiple beams. This engineering can be done using metal coatings of very small thicknesses in the single to tens of nanometer regime, or with dielectrics tuned for angled reflectivity of each wavelength at the desired linear polarization. Advantageously, the stacked structure helps hold and protect fragile thick dielectric coatings by sandwiching them between adjacent substrates.

As with most optical components, the beamformer may be used as a beam sampler to take a low profile sampling of the beam. The sampled beam can then be magnified to the limit of constructive and destructive interference; alternatively a scrambler can be used to extend this limit. The sampler can take a weak sampling of a beam but get a magnified readout of the sample by virtue of an aligned array of beamsplitters. In this case, the beamsplitters can have the same beamsplitting ratio, that ratio being weak to minimally perturb the through beam.

One can image through the beamformer. While the image will have slices of ever increasing attenuation taken from the transmitted image, it does allow for limited viewing and tuning of MOTs or other phenomena within the cell that may otherwise be completely covered by the input optics. Indeed, especially for wavelengths farther off from the designed wavelength of the sampler, it may be more reasonable to image through it to obtain useful information from the cell. Again carefully engineered layers can permit transmission with minimal perturbation of one wavelength far removed from the for purpose beam expansion wavelength.

The beamformer can be used in a nested cell. The nested cell consists of an outer vacuum chamber with an inner vacuum chamber suspended within the outer chamber, the inner vacuum chamber having a means of heating, a means of alkali atom injection, a hole between the inner and outer vacuum chamber to allow atoms to flow and it may or may not have an active pump in conjunction with one or more passive pumps. The inner chamber has multiple mirrors or reflective surfaces that are used to bounce at least one laser beam multiple times to establish an optical trap possibly with dual counter spin helicities.

A cold atom source cell can be suspended within a second larger outer vacuum chamber. The mechanisms of suspension may include Kapton film, thin silicon, thin glass, or other means of rigid materials or materials under tension to precisely define and hold the position of the inner cell with respect to the outer cell. The mechanisms of suspension are designed for minimal thermal conduction between the inner and outer cell to thermally isolate the inner cell by floating it in vacuum allowing for any heat imparted to the inner cell to be maintained as efficiently as possible. The suspension mechanisms may further be made of an electrically conductive material to provide an electrical path to electrically heat the inner cell, or they may have electrically conductive materials laminated, plated, or otherwise adhered to them for this purpose. The suspension structures can be anodically bonded, TLP bonded, or bonded by other high temperature robust methods of affixing or by virtue of mechanical clamping and tensioning be fixed.

Suspension members may be a bonded Kapton or polyimide film for HV applications which is advantageous to the ability to sandwich copper or metal traces in the polyimide film as a flex circuit as well as a suspension member. On the other hand, it can be useful to suspend the inner cell using thin glass structures bonded to the inner chamber and to a recessed and surface polished level of the outer chamber. This method allows for more rigid mounting that is CTE (coefficient of thermal expansion) matched, but risks fracture from differential heating due to compression as the inner cell heats with respect to the outer cell, or worse, fracture when the outer cell expands more than the inner cell.

In-plane expansion channels can be machined and etched to allow for uniform expansion without fracture, though the final etching smooths the surfaces. Methods of achieving this polish may be an isotropic polish, an HF vapor anneal, a polishing slurry jet, or heating to slumping temperatures to allow softening and minor reflow of the edges. The suspension structure can instead be thin silicon with the same caveats as glass, though etching processes for patterned silicon is more easily controlled.

Suspension members may also be formed by etching. A single silicon wafer may be used within which all of the necessary etching and processing is done to form the reflectors and other structures. As one of the final fabrication steps of the silicon wafer, a nitride that was patterned at some point in the process in a select region of the suspension members is flip-side machined and then etched to the nitride which acts as an etch stop. A patterned copper trace on either side of the nitride may be used to make it a bit more robust and provide the electrical path to the suspended cell, while the cell itself is essentially fabricated from a single piece of silicon. However, to achieve this, it can be advantageous to perform an initial machine operation to countersink one side, polish, and then nitride the entire wafer before proceeding to fabricate the remainder of the structures. This allows for a suspended structure which has an optical window independent of the outer optical window. Note, regardless it is likely necessary to pattern an AR coating on all optical windows to minimize parallel surface etalon effects and reflection losses on launch into the cell.

Suspension structures may be used to actuate position such as fine tuning pointing or translation of the atom beam. Such techniques would suggest an H-bridge type electrical circuit in which four to eight or even more independent suspension arms or filaments would have selectable electrically resistive, or optically selectable, traces, one per arm. All or some subset would converge on the inner cell making a network of selectable circuits through these suspension arms. Selecting which arms to run divert current through would lead to their expansion which could be used to tip, tilt, rotate, and translate the inner cell. In most cases this is redundant to adjustments that could be made with magnetic and optical alignments.

Alternatively, given thin walls of the inner cell, such traces over the inner cell with more structured subcomponent reflectors can be used to tune the field, but with much more complex results optically. The ability to point the atomic beam by this method would primarily be useful for very low atom fluxes where a relative handful of cooled atoms leave the inner cell. Such low fluxes may be due to ultra-small diameter and long apertures linking the inner cell to the outer, or due to low temperatures and pressures for very sensitive experiments.

The inner cell consists of a partially or fully hollow structure within which optical reflectors are fashioned onto the inner surfaces or out of the inner surfaces. The optical reflectors are sufficiently reflective through plating, coating, or other means to effectively and, to a high degree of efficiency, reflect an optical beam multiple times with sufficiently low loses to allow for multiple reflections to effectively fill most of the inner cavity.

The inner cell further has a means of alkali metal injection such as a region machined into the bulk of the mirror substrate without interfering with the optical trap. An alkali source is installed and sealed or affixed in place such that, when heated, alkali vapors are directly injected into the suspended cell. Alternatively, an alkali injector module can be fabricated independently and later installed or affixed to the inner hollow reflector structure with a conductance channel connecting the inner cell to the injector module.

The inner cell can have resistive heater elements attached to its outer surface or integrated into its structure. The resistive heater elements allow for resistive heating of the inner cell to maintain an elevated temperature, whereby the alkali pressure of the inner cell is maintained thermally.

The inner cell has a dielectric or structural coating, e.g., heat absorbers or black silicon. The coating allows for optical absorption of photon energy to heat the inner cell by absorbing radiation directly intended for this purpose. Alternatively, the coating can absorb the trapping laser at the end of the chamber after it has bounced multiple times through but before it retro reflects and scatters in a manner counterproductive to the cooling of the alkali atoms. These absorptive features may also line the seams of the chamber to reduce scatter from misalignment of the laser into the chamber, and to likewise more uniformly distribute optical absorbed power.

The inner cell has micro grooves or channels that are sealed off after being vacated and partially filled with a working fluid to affect a heat-pipe structure to more uniformly distribute heat along the suspended cell to maintain a more uniform temperature given that the means of heating and suspension might otherwise lead to undesirable temperature gradients.

The inner cell has reflective and absorptive regions such as polished and black silicon or black glass regions, not a part of the intended optical path, to balance emissivity of the chamber to further balance or adjust the temperature gradient of the cell.

The multiple reflections within the inner cell can be from a single beam split by multiple reflectors. The beam can be bounced in multiple right angles to affect a multi-axis optical trap with a high volumetric fill factor of the inner hollow volume. The beam can efficiently and effectively cool atoms from a thermal kinetic gas state to an optical and/or magneto-optical trapped state along at least two effective axes of cooling. This cooling can establish a column or linear periodic series of cooled atoms. The cooled atoms align to an aperture for at least one end of the cell from which the atoms are allowed or encouraged to escape at a higher rate than would the thermal un-cooled atoms in the same volume. Embodiments may be of a triangular pyramid, a square base pyramid, a roof prism, or some mix of the three.

In another embodiment, a single expanded beam hits a diffractive element that splits the beam into multiple beams of proper dimension and direction with reflector angles adjusted to launch the beams properly into the hollow reflector cavity. In another embodiment, the single beam follows a complex path covering the entire inner volume of the trap before retro-reflecting back along its path to complete the optical trap.

The single expanded beam can then be launched into a hollow chamber including a roof prism set of 90° reflectors, a series of 45° or 90° reflectors. Alternatively, the beam can be launched into a grating with an axis of symmetry along the length of the high pressure HV hollow cavity chamber with the axis exiting an aperture in the chamber to connect it to the outer HV, UHV, or XHV vacuum chamber. In the case of the grating reflector, the grating can be a single homogenous grating. The grating can have a stated axis of symmetry that efficiently splits the power between the +1 and −1 order at a specific angle for the target optical trap wavelength. This creates a long pair of beams crossing some distance above the center axis of the grating, establishing a 3-beam trap with the single incident vertical beam and the two angled diffracted beams.

In a variation, the side walls and window opposite the plane grating are polished optically and reflective for the side walls, e.g., using a high reflector coating or metallization. The top window, through which the incident beam transmitted, can be coated on the outside with a high transmission coating at normal incidence. Alternatively, the target launch incidence can be at angles matching the grating's+/−1 diffracted orders the dielectric coating to provide maximum reflectivity. This configuration creates an optical recycling of the diffracted light; the diffracted order can be adjusted to properly beam balance.

Alternatively, the side walls may be coated with a high absorption material such as a gradient index black silicon or black glass structural coating to minimize stray light beyond the first diffraction event minimizing any scattered light in this inner or to the outer chamber. Further the aperture leading to the outer chamber and the outer chamber walls themselves may be coated with a similar high absorption material to reduce light scatter, and reduce power needed to maintain the elevated temperature of the inner cell.

Alternatively, the side walls may be optically polished to maximize reflectivity. The windows to the inner and outer cell have a high quality AR coating over a broad angle range; this maximizes light transmission back out of the cell rather than risk scattered light bouncing around in an uncontrolled manner for experiments that would rather dump the optical power outside of the cell. AR coatings can be tailored to normal incidence and the most probably diffracted angle of incidence to maximize efficiency of photon removal and scatter minimization. In another embodiment, a combination of high reflectors, high absorption surfaces, and high transmission windowed regions are selectively fabricated to tailor the above effects.

Assembly of the inner hollow chamber can be achieved via anodic bonding of glass, crystalline, or ceramic materials with intermediate bonding transition layers or even with direct contact bonding between similar materials. It can further be achieved by TLP, or diffusion bonding of similar materials as well as metals and materials not traditionally bondable by such means. Or it can be assembled further by direct contact bonding of similar materials or even dissimilar materials with sufficient compliance designed into the structures to allow for minimal stress induced structural failures or delaminating during heating. This compliance can be achieved by integrating thin strain-relieving bellow or flexure like structures especially through polishing and etching of same said structures post machining or as the sole fabrication step for the sub-components.

Forming of the mirror components may be achieved by machining into a GCC (Glass, Crystal, Ceramic) or even metal material, such as with silicon, via a grinding abrasive machining process to remove the bulk of the material at the desired angle or structure. The surface can then be refined to an optical reflector by machine polishing with finer grits, slurries, with rotating grinding bits or by vibratory, orbiting, or ultrasonically actuated bits that polish individual planes or are structured as a negative of the form to polish the complimentary shape. Such polishing components may be fabricated, at least in part, as flexure-based resonant or quasi-resonant structures to convert actuation along a single axis to a multi axis motion to enable more uniform polishing to achieve superior planarization at complex concave or other difficult geometries.

Tooling for the flexure-based tool may be fabricated via etching processes, electro-discharge machining processes, or 3D additive printing processes with appropriate materials which may include but are not limited to metals, glasses, and ceramics, and polymers or composites and assemblies thereof. Polishing may be improved using conventional or modifications of a chemical-mechanical polish slurry for substrates such as silicon. Such silicon substrates may be desirable to enable assembly and bondability to other GCC materials such as Pyrex or aluminosilicates.

Alternatively pre-assembled cuvettes or rectangular cells can be used and coated by the above processes on the inside for reflection. The cell uses mounting components, end caps with one hole and a hole machined to allow launching in the side into the cell.

Assembly of cavities can be achieved by single side etching/machining and polishing in silicon. This can be followed by reflective plating/coating. The two halves or multiple sub-components are flipped into symmetric contact. Bonding can include contact bonding for straight silicon to silicon for complementary or conforming polished surfaces. Anodic bonding may be used with intermediate Pyrex thin layers, which may also be part of the suspension structure. TLP, diffusion bonding, or thermal compression bonding may be used as part of the polyimide or similar suspension attachment procedure to close the two halves at the same time. Parts can also be "wire tied" together with materials such as nichrome, tantalum or other pure malleable wires. Suspension members may also consist of such wires.

Melt bonding or slump bonding or frit bonding can be achieved with thin intermediate layers that melt at low temperatures (defined as temperatures below which already attached components and plating materials will not fail or degrade appreciably, typically under 570° C.). Flip assembly may be achieved in a large array of components from a wafer and then singulated by dicing, cleaving, or other common singulation techniques of components from silicon wafers.

Forming of the grating components can be achieved by standard etching or stamping techniques. It is generally advantageous to etch in silicon for the established MEMS processing and material compatibility for subsequent assembly. Coatings of the grating can be advisable to improve diffraction efficiency. Multi step etching and masking processes can be used to make blazed, stepped, or angled structures to improve diffraction efficiency along preferred orders such as just the +1 or both the +/−1 order. Coatings may consist of dielectric HR coatings or metal coatings via thermal evaporation, sputtering, electroplating, or combinations thereof. Gratings formed in such ways have the advantage of being UHV compatible and can therefore be placed in the inner chamber to maximize optical efficiency and path length maximizing trap volume. Further, getter materials can be plated to the grating or near the region of the grating to absorb undesirable gasses as close to the MOT as possible for situations where pressure near the optical elements is critical for MOT behavior where background pressure is critical.

Additionally, using selectively grown and etched oxides or metals such as by line of site deposition on blazed structures or angling the deposition to mask certain faces of a grating etched structure, a passivation or activation layer may be deposited or etched from select faces to enable high reflective or high absorption coatings on select faces. For instance, a sacrificial metal or oxide mask can be used to protect certain faces of subsequent respective oxide or metal coatings after which an etch or removal process targeting the first layer is used to remove the coating from the undesired face. By this method, for example, raised sections and select side walls may be highly reflective while others are native or highly absorptive. Material deposited can also be used to tailor polarization effects.

Glass reforming via reflow of Pyrex or similar (for silicon substrates) at melting temperatures may be used to form more integrated windows or compound substrates prior to final polishing of substrates. Silicon structures may be machined by the methods mentioned above before cleaning and melting glass over or through the machined or etched channels, holes, or structures, then further machining or polishing can be used to create the appropriate integrated structure such as a low profile integrated window in silicon where the profile of a window bonded the outside of the silicon structure would consume limited or unnecessary volume inside the vacuum chamber. Such integrated windows further benefit from minimal mass and will therefore be more uniform in temperature Likewise reflow about silicon structures can be used to create electrically or, to a lesser extent thermally, isolated structural mounting points or feedthroughs. The silicon of the feedthrough through a silicon hole with a glass insulator may be of two different doped silicon substrates such that the larger bulk substrate is more resistive, while the feedthrough structure is more highly doped to be conductive. The advantage of such a feedthrough is low CTE mismatch and minimal profile, volume, and thermal mass.

Reflowing glass can also be used over a pre-polished and even an AR coated or other dielectrically coated or structured surface such as a grating. The silicon negative is then etched away via a hydroxide or other silicon etchant that minimally attacks the glass structure or even the coated structure to allow for an effective negative molding of a structure, even a hollow channel, with optically polished surfaces or grating etched surfaces, both of which are easier on a convex part such as a rectangular silicon plug, than they are on the inside of any convex feature. By this method gratings that were only achievable in silicon may be HR coated, or AR coated as appropriate for the glass, and then the structure and possibly the coating may be transferred to a convex or enclosed structure of glass.

Further coating of the glass or silicon structural inner dimension/diameter can be achieved via chemical vapor deposition to achieve anti-reflection or high reflector coatings with dielectrics. Alternatively a wire filament drawn through the hollow cavity may be used to plate via-line-of-sight thermal evaporation, the inside of the structure. Further electroplating with a single or multiple plating and etching cycles can be used to deposit metal coatings. Multiple coatings and partial to near complete etching can be used for concave glass or silicon structures to uniformly plate the surfaces with optical or near optical finishes where each etch cycle conditions the surface to enable superior successive plating attempts, or by leaving behind seed atoms for successive plating's. Combinations of these methods can be used to put down seed layers such as by melt and etch transfer of coated surfaces of easily evaporated metals or noble metals, followed by electroplating of the inner glass walls. For transfer of metals surfaced parts through the glass reflow process, one can use pressurized forming noble gas, or even vacuum environments, depending on the composition of the metal and glass.

Magnetic fields can be established: by at least one pair of coils with subsequent pairs along orthogonal axis; with sets of permanent magnets likewise in multiples of two sets to establish similar optical axis; or by single complex shaped and polled magnets which allow for magnetic nulls to be established at distances no greater than the effective diameter of the magnet. The null may be established along an axis of symmetry such as that from a ring magnet polled axially which exhibits a null along the axis some distance from the center of mass at a distance less than the diameter of the magnet.

This magnetic null may be adjusted by complex topographical structuring of the magnetic surface and subsequent complex polling either symmetrically or periodically with homogenous or inhomogeneous field strengths for each polled section to more precisely tailor the magnetic field gradient about the null. Sets of magnets on a single side of the MOT may establish the null by say using a ring magnet or a set of magnets to approximate a ring establishing the null, while a second magnet or set of magnets installed along the axis of the first set with a slight offset from the center of mass of the first set are used to shim or fine tune the center position or magnetic gradient from the null.

Coils can be mounted externally to the vacuum chamber. Alternatively, the coils may be integrated into the substrates defining vacuum walls of the vacuum chamber through MEMS like etching and deposition processes or via etching and plating processes such as electroplating on patterned surfaces or within etched, machined or grown channels. Successive sections of coils may be connected via flip-chip or bonded stacking methods or by direct contact during assembly of stacks. Conduction paths for coils or other traces can be established via patterned doping or ion treatments and or etching or altering the surface of substrate materials such as silicon or glass or via high voltage ion metal, salt, or doping or thermal diffusion based ion migration and alignment techniques.

The atom injector module can be a tube, a bonded tube structure, or a stacked bonded glass-silicon or other type of structure. An alkali source and possibly a getter or other pressure affecting material can be installed within the injector module. The alkali source may be a salt, pill or other material, composite, alloy, or loaded substrate that, when heated, stimulated, or excited with thermal, photonic, or electrical energy, produces a plurality of alkali atoms in vapor form. The atom injector having at least one optical window which may or may not be a membrane material such as silicon nitride, silicon, Pyrex, Kapton, graphene, graphite, or other sufficiently vacuum tight material sealed over a channel or chamber connecting to the alkali source.

The atom injector can then be fabricated before final assembly of the vacuum system by forming, machining, and then installing into a glass, silicon, metal, ceramic, or other structure, or composite structure, the alkali source material. Then the module can be vacated. Then the module can be sealed with the membrane material or another seal independent of the membrane material.

This module can then be singulated from a larger array, cut from a larger bulk substrate or otherwise extracted and handled in atmosphere without contaminating the inner vacated chamber or channels. The module can then be stored and at a later date installed, or bonded to the inner hollow chamber before pulling vacuum on and sealing the outer chamber. Before or after the final seal, but after pulling vacuum on the outer chamber, the alkali source module may then be connected to the inner chamber by compromising, or adjusting the permeation properties of the membrane seal between the alkali module and the inner chamber it is installed to. Passive getter materials can be located within or on the surface of the atom injector module to absorb undesired gasses or byproducts of the production of the alkali atom vapor to minimize contamination of the vacuum chamber.

The membrane can be a selectively permeable membrane comprising graphene, graphite, a piezo based material, an intercalable material or similar to allow for thermal or electrical actuation of the permeability of the membrane. The membrane can include a thin film over the membrane which can be impermeable graphene until it is intentionally compromised, or a crystalline material which may be heated or stressed to introduce micro fractures through which controlled heating or electrostatics may control the permeation rate through a mostly intact membrane.

The structure of the alkali module can be a tube with a membrane on one end or installed over a sidewall polished down to breach the circumference at one point, or wrapped with a membrane to seal the breach at least temporarily. The structure may alternatively be a stack of a GCC (glass ceramic crystalline) material such that individual layers are machined with certain features then aligned and assembled to adjacent layers to form a cavity with a rectangular cross section in at least one axis. One of the layers can be the entire membrane or comprised partially of the membrane as formed by selective and careful etching, polishing or other methods of material removal. The membrane can be grown or laid over a small hole or grid like scaffold with materials such as silicon, oxides or nitrides of the scaffold grid, or graphene or other atomically perfect planar materials similar to graphene.

Vacuum quality of the cell may become compromised over time due to permeation of noble gasses through the glass as noble gasses cannot be removed with passive getters. A low permeation or zero permeation barrier on the surface of the glass, such as a layer of atomically perfect graphene, can be used to mitigate the permeation. The glass can consist of an aluminosilicate CTE matched to silicon such as several modern display glasses with a CTE around 3×10-6 m/m. Such glasses can lower the permeation rate several orders of magnitude.

Another technique can be a barrier vacuum between the cell and another cell; within the outer cell, only a roughing vacuum is necessary. This can be achieved by establishing a second outer chamber to the first outer chamber that uses the same silicon backbone but has at least one countersunk and polished perimeter plane. Such stacked windows, separated by at least a few hundred microns to account for vacuum pressure bowing to prevent touching, can leverage AR coatings to minimize etalon effect and losses just launching light into the cell. Alternatively the cell and external mount and optics can be encased in an outer vacuum chamber with a rough vacuum pulled to the same effect and with a lot less complexity on the inner cell, though it would increase the volume more than adding another layer to the cell itself would.

Vacuum quality can be improved by installing a miniature ion pump into the cell and firing it periodically. Such a pump can be completely devoid of any magnetic material and only periodically, depending on the diffusion rate of the cell, have the magnets temporarily installed for a short vacuum maintenance cycle. During this cycle, any getter material may be heated to degas the surface into the ion pump and diffusion captured gasses that are mobile more into the bulk to refresh the getter material. Such a pump involves only a minimal addition in volume by utilizing only titanium and silicon. Alternatively, the pump can be made entirely of glass and silicon such that the silicon wall itself acts as the anode, while a second electrically isolated wall acts as the cathode in either a symmetric or split style pump.

Figure 12:
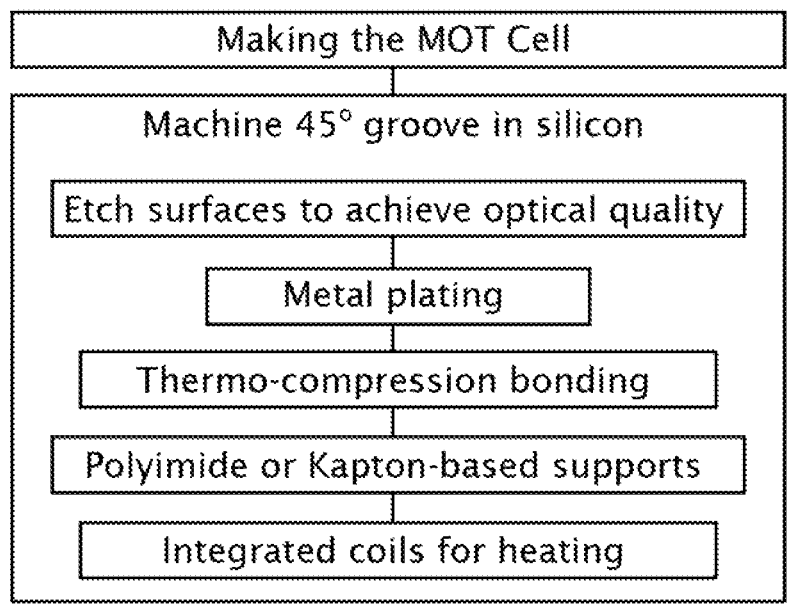
FIG. 12 is a flow chart of a process for making a MOT cell.
Figure 13:
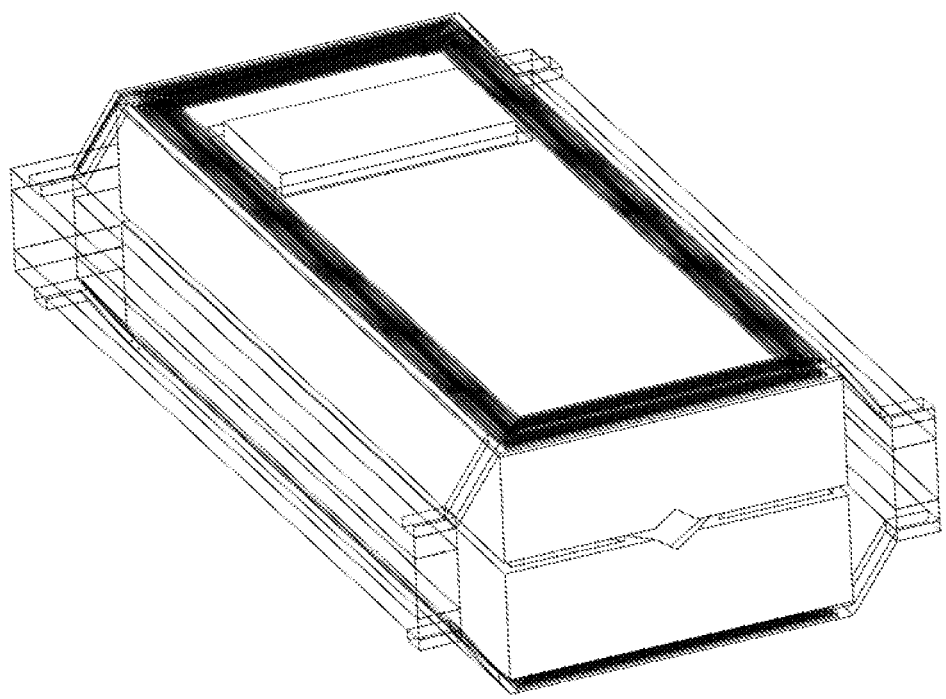
FIG. 13 is an image of an MOT cell.

FIG. 12 is a flow chart of a process for making a MOT cell. FIG. 13 is an image of an MOT cell. The laser beam window size may vary up to 100% of top surface.

A process for fabricating a MOT cell can begin with machining of 45° grooves on the face of at least one rectangular piece of silicon. Further processing of the machined surfaces makes them flat enough for optical mirrors. The methods for etching the surfaces include anisotropic etches (an example of which is shown on the right of FIG. 13) and isotropic etches. After the 45° grooves have been smoothed to optical quality, a layer of metal, or other reflective coating will be deposited. The metal has good reflectivity at the laser cooling wavelength (e.g., 780) nm for rubidium, 852 for cesium). The metal does not oxidize rapidly in air, either by its nature or because of a passivation coating, so that the parts can be handled easily. Gold is not a good candidate, as gold forms intermetallics with alkali metal species.

Figure 14:
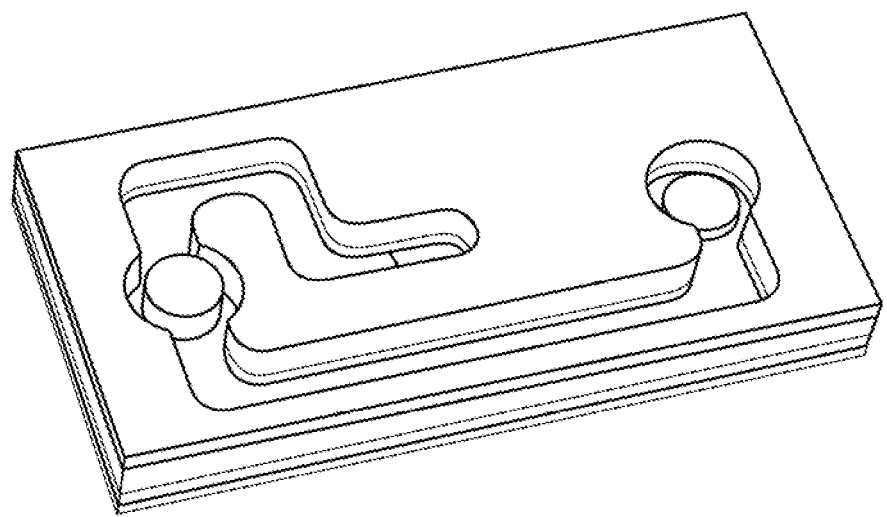
FIG. 14 is a set of images relating to a rubidium (Rb) source capsule for the MOT cell of FIG. 13.
Figure 14:
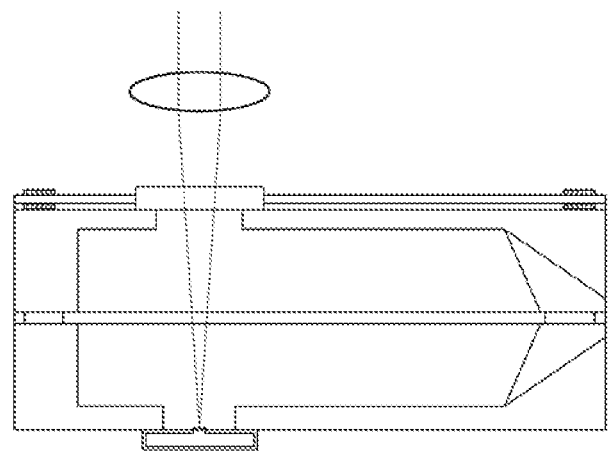

The rubidium capsules are small vacuum cells fabricated from glass and silicon. See FIGS. 14 and 15. They contain an alkali metal source and non-evaporable getter. Conductance channels are created by machining the bulk silicon. The top side (top picture on the previous slide) is sealed via anodic bonding of a glass cover plate.

Figure 15:
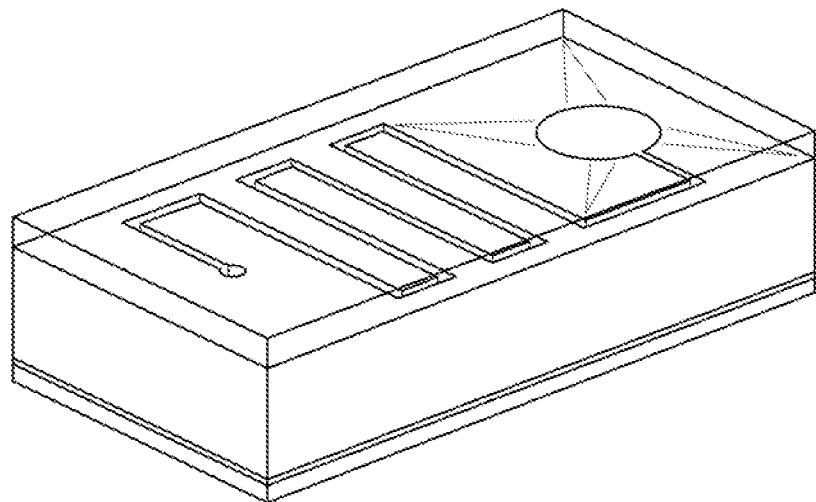
FIG. 15 is a dual-perspective view of an alternative Rb dispenser.
Figure 15:
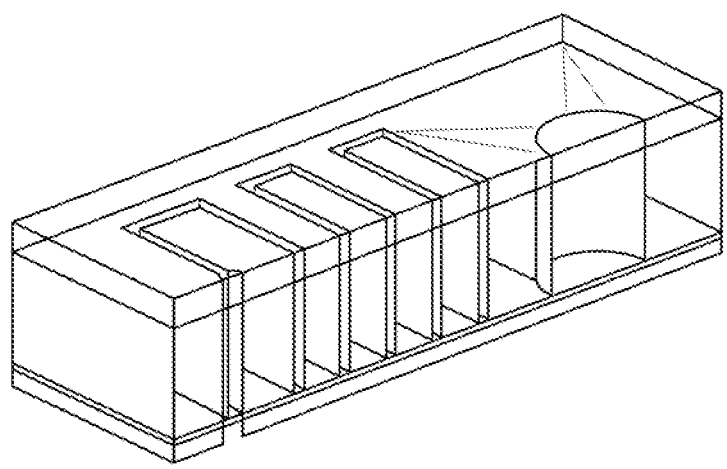

On the back side of the capsule, the output channel is sealed with a membrane (e.g. silicon nitride or silicon oxide). The capsule is bonded to a vacuum system. A high-power laser then ablates the membrane, opening up the capsule to the vacuum system. Note that the capsule is sealed under vacuum, so that atmospheric gases are not introduced into the vacuum system when the membrane is ablated. In addition to alkali metals, the capsules can be filled with other metallic/atomic/molecular sources. The capsules can be used for any vacuum system requiring a source of atoms/molecules, not just the atomic clock considered herein. FIG. 15 presents an alternate dispenser with long frustrated vapor path for vapor control.

Figure 16:
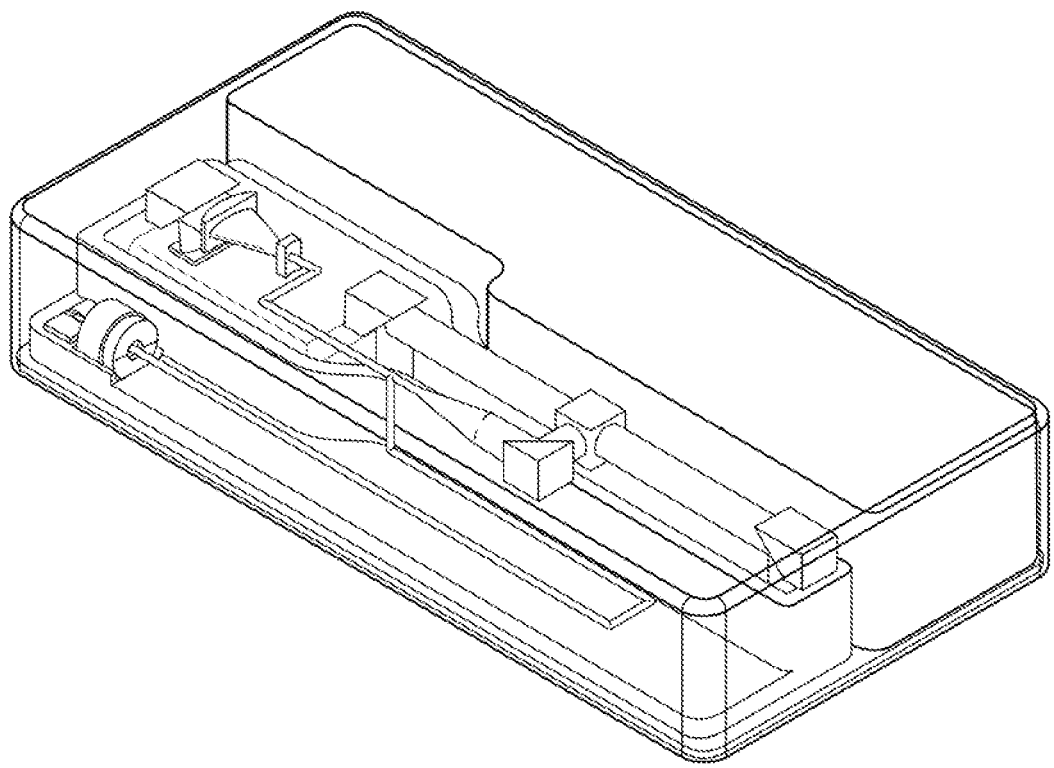
FIG. 16 is an image of an integrated system showing a laser path for entire system.
Figure 17:
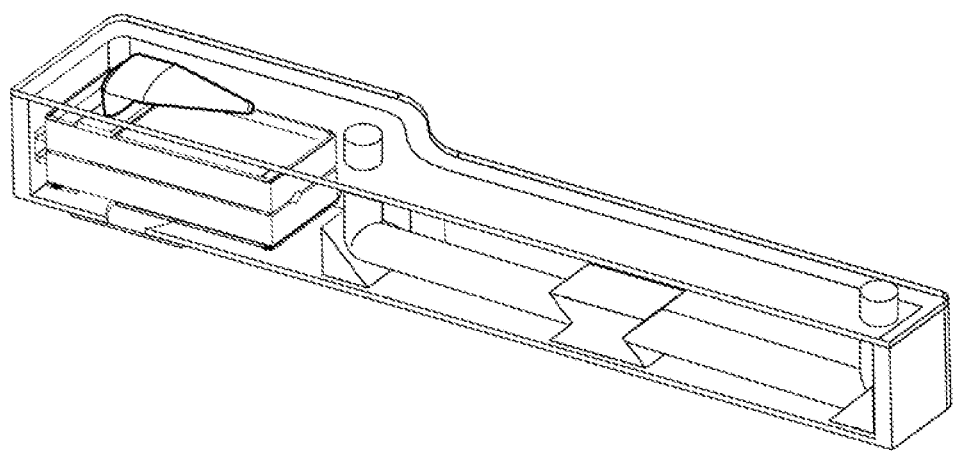
FIG. 17 is a cutaway of a suspended-cell enclosure.
Figure 18:
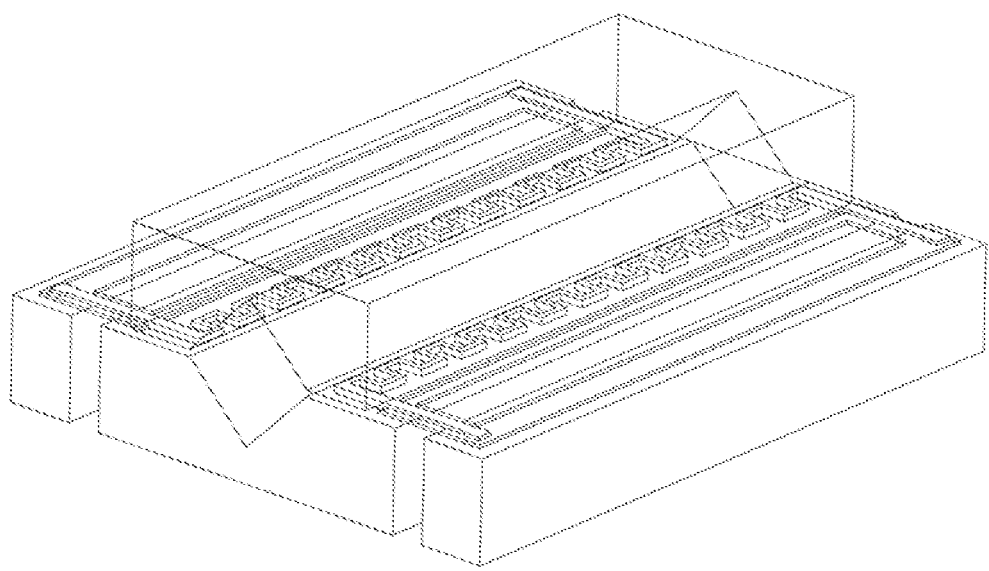
FIG. 18 is a suspended cell showing suspension members with electrical heating elements.
Figure 19:
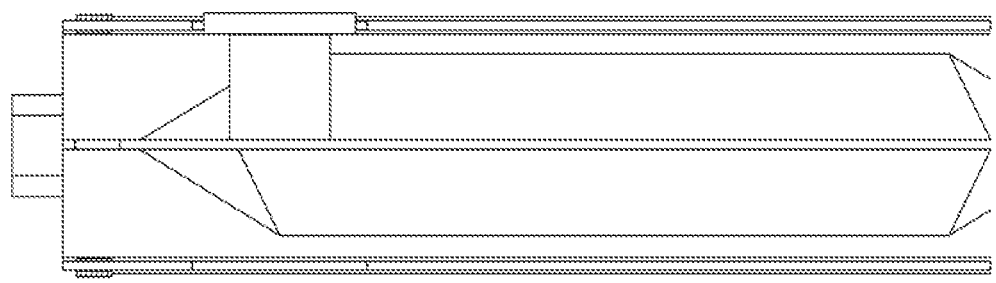
FIG. 19 is a side cross sectional view of a suspended hollow cell showing geometry of an interior etched and polished chamber.
Figure 20:
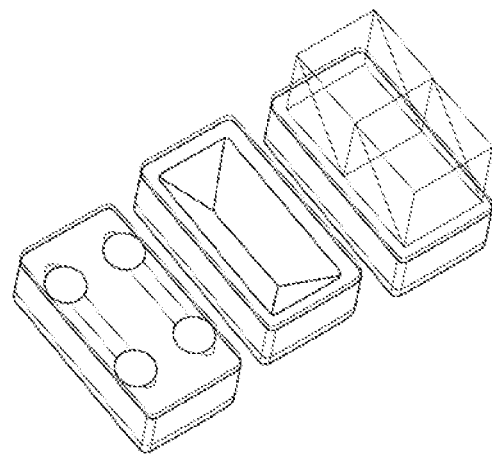
FIG. 20 is an illustration of pages 78-79 of a lab notebook illustrating single-beam low volume beamformers.
Figure 20:
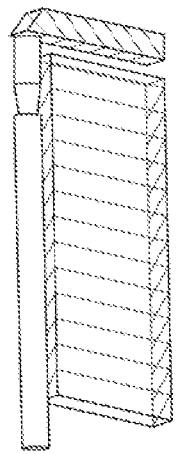
Figure 20:
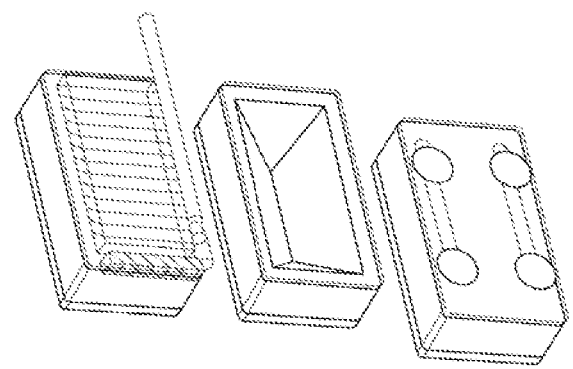
Figure 21:
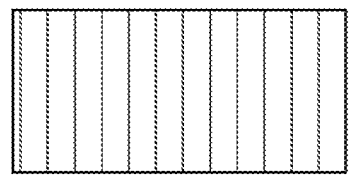
FIG. 21 is an illustration of page 80 of a lab notebook illustrating a beamsplitter series beamformer.
Figure 21:
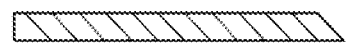
Figure 21:
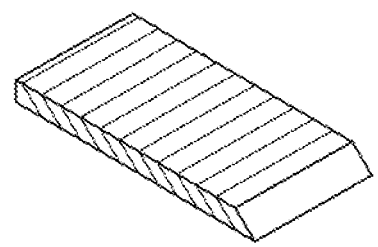
Figure 22:
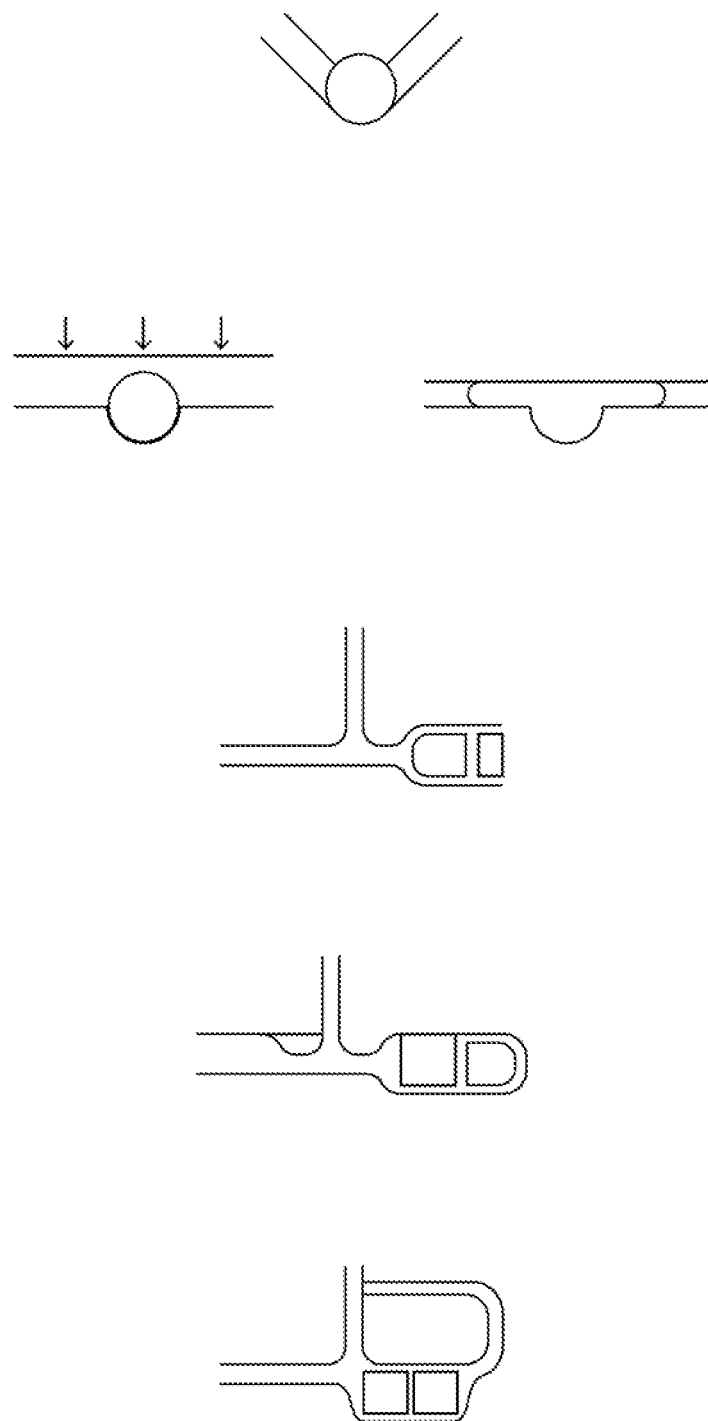
FIG. 22 is an illustration of a page 89 of a laboratory notebook illustrating a means of scaling using indium or TLP of other molten displacement seals with a plunger displacement technique.
Figure 23:
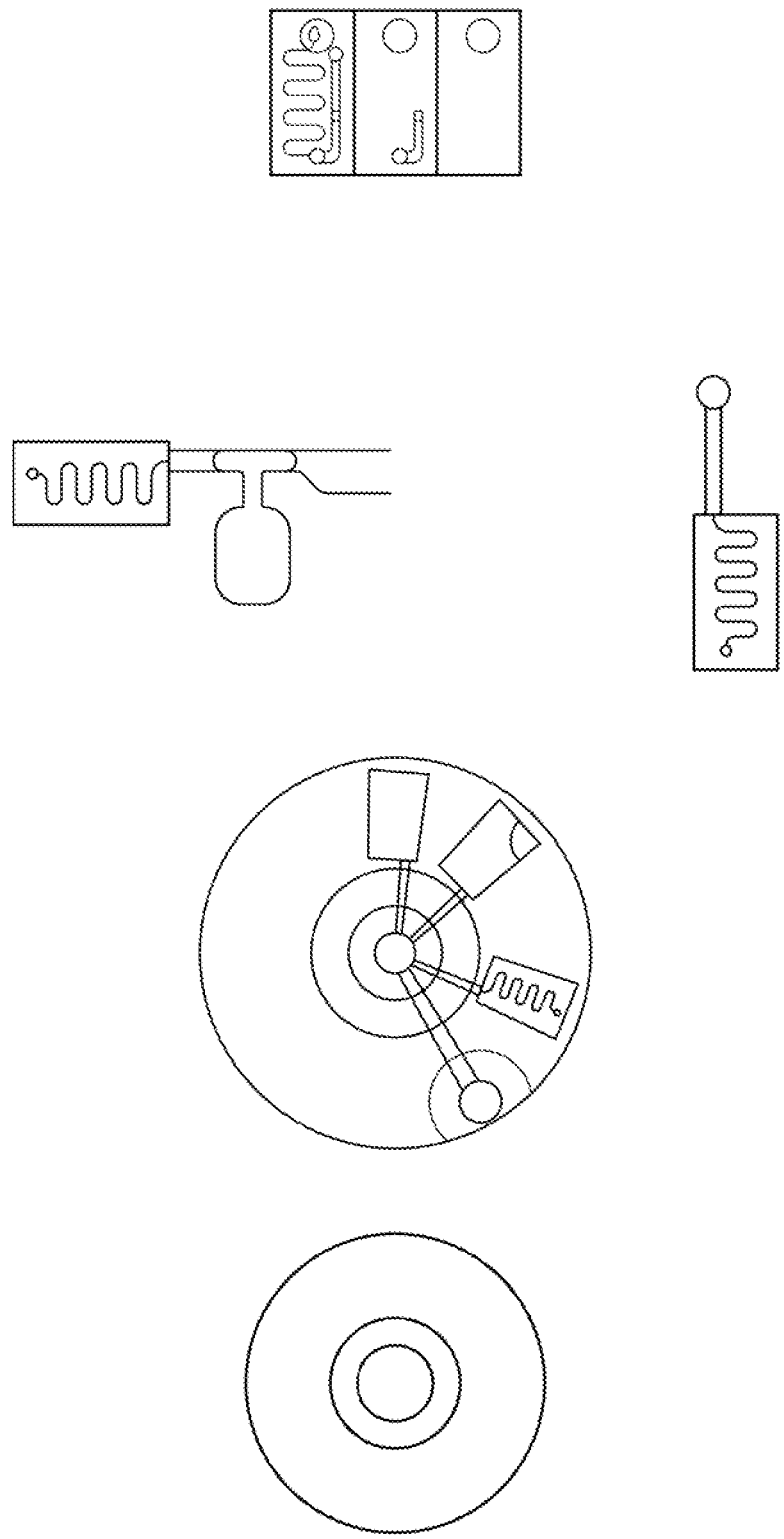
FIG. 23 is an illustration of a page 94 of a laboratory notebook illustrating a process for fabricating an array of rubidium dispensers from a single wafer.
Figure 24:
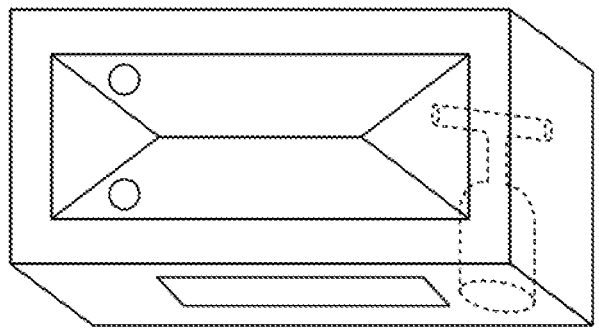
FIG. 24 is an illustration of a page 97 of a laboratory notebook illustrating methods of producing indium or TLP or diffusion or displaced plug system sealing integrated into the bulk of a silicon etched and polished structure.
Figure 24:
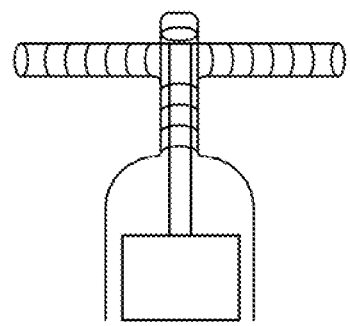
Figure 24:
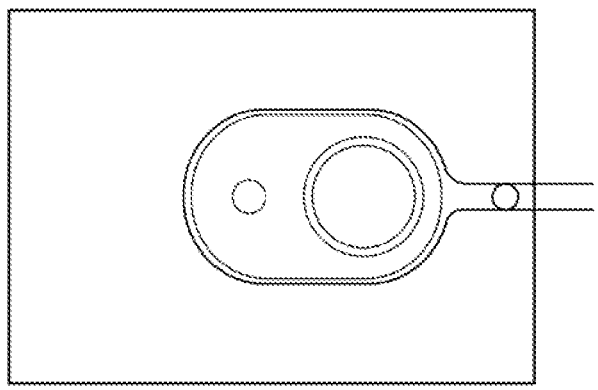
Figure 25:
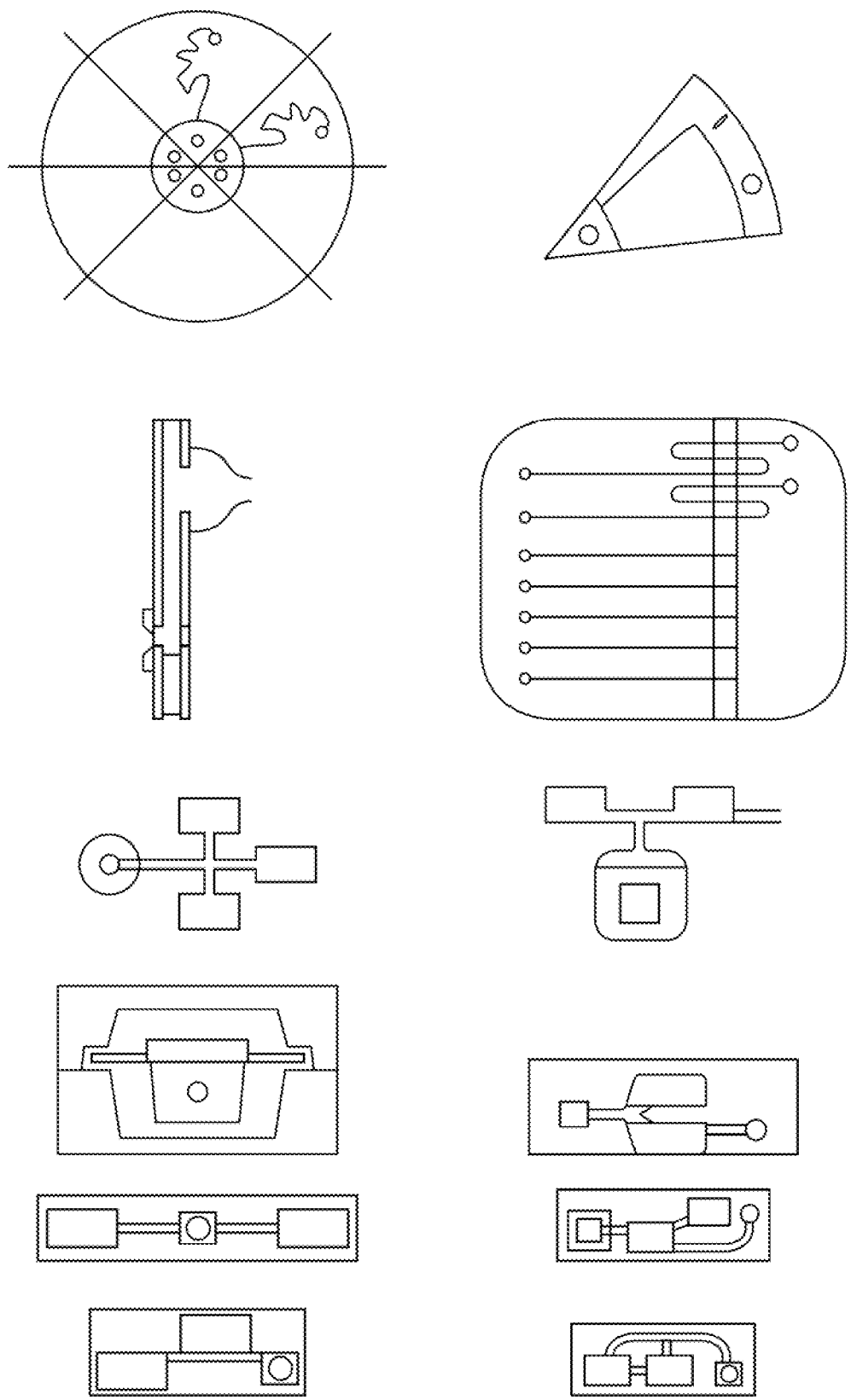
FIG. 25 is an illustration of a page 100 of a laboratory notebook illustrating filing and sealing of dispenser modules.

FIG. 16 shows an entire laser path for an entire integrated system. A beamformer may replace the cylindrical and spherical optics. FIG. 17 is a cutaway of the suspended cell enclosure. FIG. 18 is a suspended cell showing suspension members with electrical heating elements. As shown, the cell implements a double V MOT; in an alternative suspended cell, a single-V MOT is implemented. FIG. 19 is a side cross-sectional view of a suspended hollow cell showing geometry of an interior etched and polished chamber. In an alternative embodiment, a V-MOT is implemented.

The present invention provides a beamformer with stacked monolithic beamsplitters. Herein, "beamsplitter" encompasses devices that split an incoming beam of visible and/or invisible light, e.g., infra-red, ultra-violet, into spatially distinct output beams. The beamsplitters herein include transparent bulk elements and partially and completely reflective coatings. Such a device with a completely reflective coating is considered a beamsplitter "in the limit", even though it does not actually split a beam.

Herein, a "beamformer" is a device for forming or reforming a beam of light. More specifically, a device for generating a beam of light having a first cross section from a beam of light having a second cross section that is not congruent with the first cross section.

A beamsplitter is "monolithic" if the bulk of the beamsplitter is a single piece of material, and not an assembly of smaller macro-scale pieces. The fact that a beamsplitter includes reflective coatings and, in some cases, anti-reflective coatings, does not render the beamsplitter non-monolithic. However, cube beamsplitters that result from assembling triangular prisms are not monolithic.

Herein, a "stack" is a linear array of elements (e.g., beamsplitters) in which the elements are in contact with each other. Herein, sheets of transparent material bonded together are "stacks" of sheets. Herein, an "array" is an ordered arrangement.

The beamformers carved from the stacks of sheets are stacks of prisms. Typically, such a beamformer has an input or front prism that is a triangular or trapezoidal prism, while the remaining prisms can be rhomboid. A rhomboid prism is a parallelepiped having four rectangular faces and parallel faces in the shape of rhombuses. A trapezoidal prism has a parallel pair of faces in the form of non-rectangular trapezoids, and a parallel pair of rectangular faces of different lengths separated by a non-parallel pair of rectangular faces. A triangular prism has a parallel pair of triangular faces separated by a trio of rectangular faces.

Herein, a "prism" is an object that is transparent to light of at least one frequency, the object having rectangular faces connecting parallel congruent polygonal faces. The parallel congruent faces may be, for example, triangular, rectangular, trapezoidal, or rhombic. Herein, "rectangular" refers to quadrilaterals with two sets of parallel sides, with each side forming right angles with two other sides; herein, squares are rectangles in which all sides of equal length. Herein, "trapezoidal" characterizes quadrilaterals with parallel sides of unequal length and excludes rectangles. Herein, "rhombic" refers to quadrilaterals with two sets of parallel sides in which each side forms an oblique (non-right) angle with each of two adjacent sides.

Herein, "monolithic" means made from a single piece as opposed to being assembled from separate pieces. A cube beamsplitter is not monolithic because it is formed by bonding two triangular prisms together.

Herein, "oblique" refers to a relationship between two lines or planes that are not parallel and are not orthogonal, but that meet or otherwise intersect. Herein, a face of a polyhedron is oblique if it does not form a right angle with any face adjacent to it. All the faces of the prisms in the illustrated embodiment to which reflective coatings are oblique. A face of a prism is non-oblique if it forms a right angle with at least one other face of the prism. For example, in the illustrated embodiments, the front (input) and rear (reflective) faces of a rhomboid-prism beamsplitter are oblique with respect to the other four faces; adjacent pairs of the other four faces being orthogonal (forming right angles) with respect to each other. In the case of the illustrated triangular-prism beamsplitters, the rear face is oblique with respect to the front (input) face and the output face, while the input face and the output face are orthogonal to each other. In the cases of the illustrated trapezoidal prism, the rear face is oblique with respect to all other faces, whereas adjacent ones of the other faces are orthogonal to each other.

Herein, "adjacent" refers to objects that are in contact with each other or are in an array and are closer to each other than are any two non-adjacent objects in the array. Herein, an "anti-reflection coating", aka, "antireflective coating" or "AR coating", is a type of optical coating applied to optical elements to reduce reflection, typically, so as to enhance transmission into or out of the optical element. The reflective coatings on the illustrated embodiments have different reflectivities in two senses: 1) they are not all the same; and, more strictly, 2) no two are the same. In some embodiments, only the first sense is applicable.

Herein, all art labeled "prior art", if any, is admitted prior art; all art not labelled "prior art" is not admitted prior art. The illustrated embodiments as well as modifications thereto and variation thereon are provided for by the present invention, the scope of which is defined by the following claims.

What is claimed is:

1. A beamformer assembly, comprising:
   a plurality of beamformers, each of the plurality of beamformers including a plurality of prisms, the plurality of prisms having a plurality of substantially parallel faces and a plurality of output faces, the plurality of substantially parallel faces being at an oblique angle from the plurality of output faces; and
   a plurality of reflective layers interleaved with the plurality of prisms; wherein a first output beam for a first beamformer of the plurality of beamformers is in a first direction and a second output beam for a second beamformer of the plurality of beamformers is in a second direction, wherein the first output beam intersects with the second output beam to form an intersection region.

2. The beamformer assembly of claim 1, wherein the plurality of reflective layers has a plurality of reflectivities.

3. The beamformer assembly of claim 2, wherein the plurality of beamformers includes an input face and wherein the plurality of reflectivities for at least one beamformer of the plurality of beamformers monotonically increases with distance from the input face.

4. The beamformer assembly of claim 1, wherein at least a portion of the beamformer assembly is integrated onto a wall of a vacuum cell.

5. The beamformer assembly of claim 4 wherein an output beam is transmitted through the wall to within the vacuum cell.

6. The beamformer assembly of claim 5, wherein an output beam from the beamformer assembly is used in the formation of at least one of an optical trap, a magneto-optical trap, an optical molasses, or an optical lattice.

7. The beamformer assembly of claim 1, wherein:
   the first output beam includes more than one output beam;
   the second output beam includes more than one output beam; and
   the more than one output beam of the first output beam are orthogonal to the more than one output beam of the second output beam in the intersection region.

8. A vacuum cell, comprising:
   a plurality of walls forming a vacuum chamber therein;
   a beamform assembly including a plurality of beamformers, wherein at least a portion of the beamformer assembly is integrated on at least one of the plurality of walls, each of the plurality of beamformers including
      a plurality of prisms, the plurality of prisms having a plurality of substantially parallel faces and a plurality of output faces, the plurality of substantially parallel faces being at an oblique angle from the plurality of output faces; and
      a plurality of reflective layers interleaved with the plurality of prisms; wherein a first output beam for a first beamformer of the plurality of beamformers is in a first direction and a second output beam for a second beamformer of the plurality of beamformers is in a second direction, wherein the first output beam intersects with the second output beam to form an intersection region.

9. The vacuum cell of claim 8, wherein the plurality of reflective layers has a plurality of reflectivities.

10. The vacuum cell of claim 8, wherein the plurality of beamformers includes an input face and wherein the plurality of reflectivities for at least one beamformer of the plurality of beamformers monotonically increases with distance from the input face.

11. A method for providing a beamformer assembly, comprising: providing a plurality of beamformers, including, for each of the plurality of beamformers providing a plurality of prisms, the plurality of prisms having a plurality of substantially parallel faces and a plurality of output faces, the plurality of substantially parallel faces being at an oblique angle from the plurality of output faces; and
   providing a plurality of reflective layers interleaved with the plurality of prisms;
   wherein a first output beam for a first beamformer of the plurality of beamformers is in a first direction and a second output beam for a second beamformer of the plurality of beamformers is in a second direction, wherein the first output beam intersects with the second output beam to form an intersection region.

12. The method of claim 11, wherein the plurality of reflective layers has a plurality of reflectivities.

13. The method of claim 12, wherein the plurality of beamformers includes an input face and wherein the plurality of reflectivities for at least one beamformer of the plurality of beamformers monotonically increases with distance from the input face.

14. The method of claim 11, further comprising:
mounting at least a portion of the beamformer assembly onto a wall of a vacuum cell.

15. The method of claim 14 wherein an output beam is transmitted through the wall to within the vacuum cell.

16. The method of claim 15, wherein an output beam from the beamformer assembly is used in the formation of at least one of an optical trap, a magneto-optical trap, an optical molasses, or an optical lattice.

* * * * *